United States Patent
Matsumura et al.

(10) Patent No.: US 12,495,312 B2
(45) Date of Patent: Dec. 9, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Shaozhen Guo, Beijing (CN); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 467 days.

(21) Appl. No.: 17/910,997

(22) PCT Filed: Mar. 13, 2020

(86) PCT No.: PCT/JP2020/011207
§ 371 (c)(1),
(2) Date: Sep. 12, 2022

(87) PCT Pub. No.: WO2021/181684
PCT Pub. Date: Sep. 16, 2021

(65) Prior Publication Data
US 2023/0171611 A1    Jun. 1, 2023

(51) Int. Cl.
*H04W 16/28* (2009.01)
*H04W 72/1273* (2023.01)
*H04W 72/23* (2023.01)

(52) U.S. Cl.
CPC ....... *H04W 16/28* (2013.01); *H04W 72/1273* (2013.01); *H04W 72/23* (2023.01)

(58) Field of Classification Search
CPC . H04W 16/28; H04W 72/1273; H04W 72/23; H04B 7/024; H04B 7/06968; H04B 7/088; H04L 1/08

(Continued)

(56) References Cited

U.S. PATENT DOCUMENTS

2020/0074988 A1    3/2020  Park et al.
2020/0120644 A1*   4/2020  Zhou .................. H04B 7/0689
(Continued)

FOREIGN PATENT DOCUMENTS

CN    110798894 A      2/2020
WO    2019099659 A1    5/2019
(Continued)

OTHER PUBLICATIONS

Vivo, Discussion on remaining issues on M-TRP and text proposals, 3GPP TSG RAN WG1 #100, e-Meeting, Feb. 24-Mar. 6, 2020, R1-2000333. (Year: 2020).*

(Continued)

*Primary Examiner* — Robert J Lopata
(74) *Attorney, Agent, or Firm* — Osha Bergman Watanabe & Burton LLP

(57) ABSTRACT

A terminal according to an aspect of the present disclosure includes a control section that determines one or more default transmission configuration indication (TCI) states to be applied to respective reception occasions of repeated reception of a downlink shared channel (Physical downlink Shared Channel (PDSCH)), and a receiving section that carries out the repeated reception by using a spatial domain reception filter based on the one or more default TCI states. According to an aspect of the present disclosure, a QCL parameter for multi-panels/TRPs can be appropriately determined.

3 Claims, 23 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2020/0288479 A1 | 9/2020 | Xi et al. | |
| 2020/0337058 A1* | 10/2020 | Song | ........................ H04L 5/10 |
| 2021/0226689 A1* | 7/2021 | Farag | .................... H04W 24/10 |
| 2022/0109487 A1* | 4/2022 | Guo | ...................... H04L 5/0023 |
| 2022/0304028 A1* | 9/2022 | Bagheri | ............ H04W 72/1273 |
| 2022/0386295 A1 | 12/2022 | Zhang et al. | |

FOREIGN PATENT DOCUMENTS

| | | | | |
|---|---|---|---|---|
| WO | 2019153347 A1 | 8/2019 | | |
| WO | 2019/244221 A1 | 12/2019 | | |
| WO | WO-2021091361 A1 * | 5/2021 | ........... | H04B 17/373 |
| WO | WO-2021163408 A1 * | 8/2021 | ........... | H04L 5/0048 |

OTHER PUBLICATIONS

Extended European Search Report issued in European Application No. 20923978.9, mailed Nov. 6, 2023 (8 pages).

Huawei, HiSilicon: "Enhancements on multi-TRP/panel transmission", 3GPP TSG RAN WG1 Meeting #98bis, R1-1910073; Chongqing, China, Oct. 14-20, 2019 (30 pages).

NTT DOCOMO, Inc: "Enhancements on multi-TRP/panel transmission", 3GPP TSG RAN WG1 #99, R1-1912893; Reno, USA, Nov. 18-22, 2019 (21 pages).

International Search Report issued in PCT/JP2020/011207 on Oct. 27, 2020 (2 pages).

Written Opinion of the International Searching Authority issued in PCT/JP2020/011207 on Oct. 27, 2020 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in Chinese Patent Application No. 202080100496.3, dated Sep. 4, 2024 (15 pages).

3GPP TSG RAN WG1 #100; R1-2000333; vivo; "Discussion on remaining issues on M-TRP and text proposals"; e-Meeting, Feb. 24-Mar. 6, 2020 (17 pages).

Extended European Search Report issued in counterpart European Patent Application No. 24175939.8, mailed on Dec. 9, 2024 (12 pages).

* cited by examiner

SCHEME 2a

SCHEME 2a

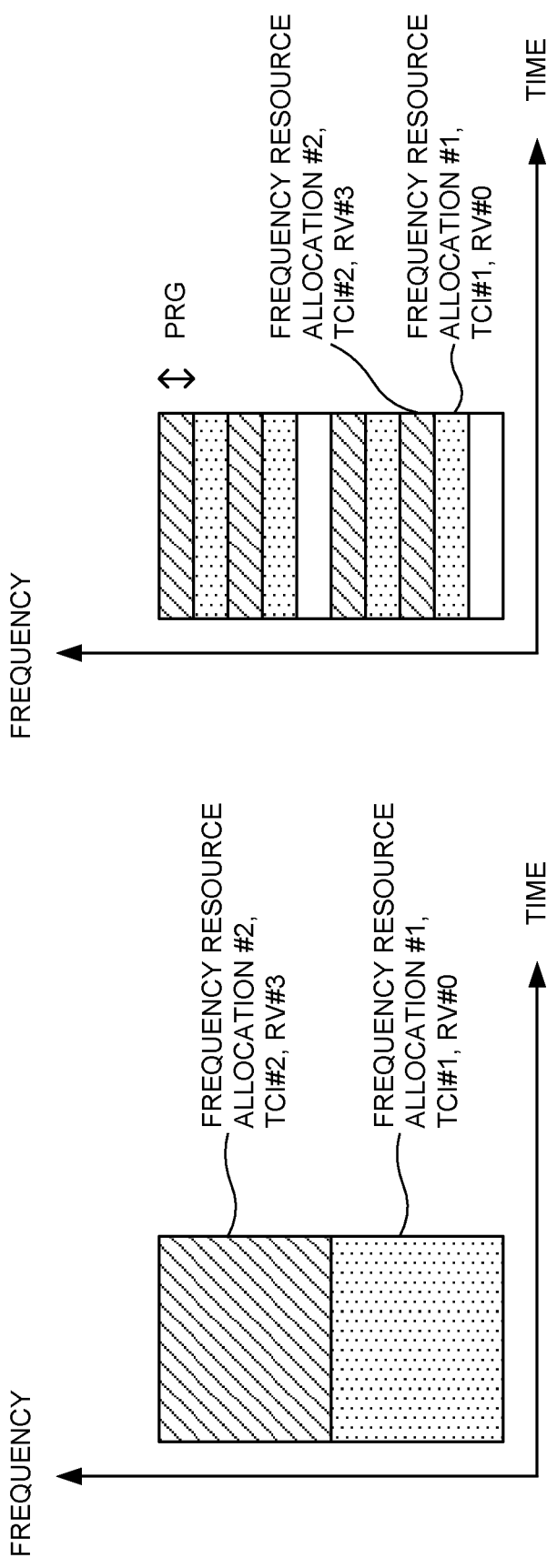

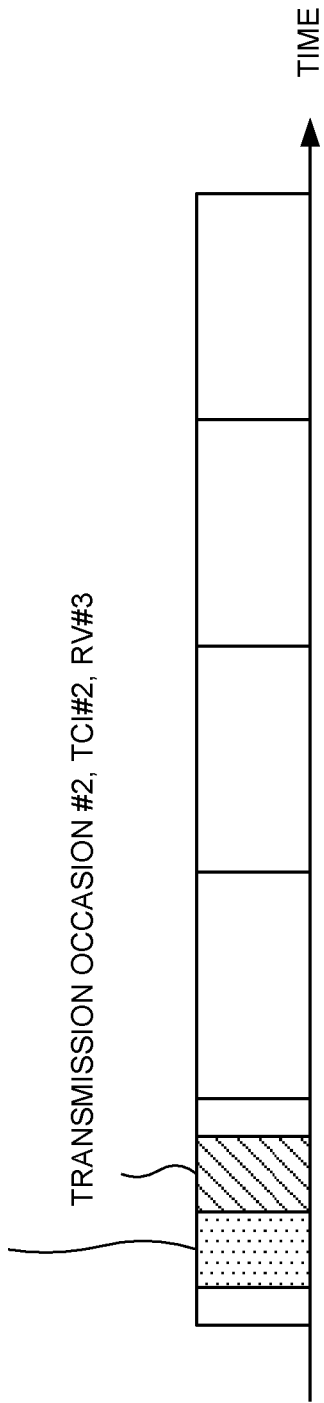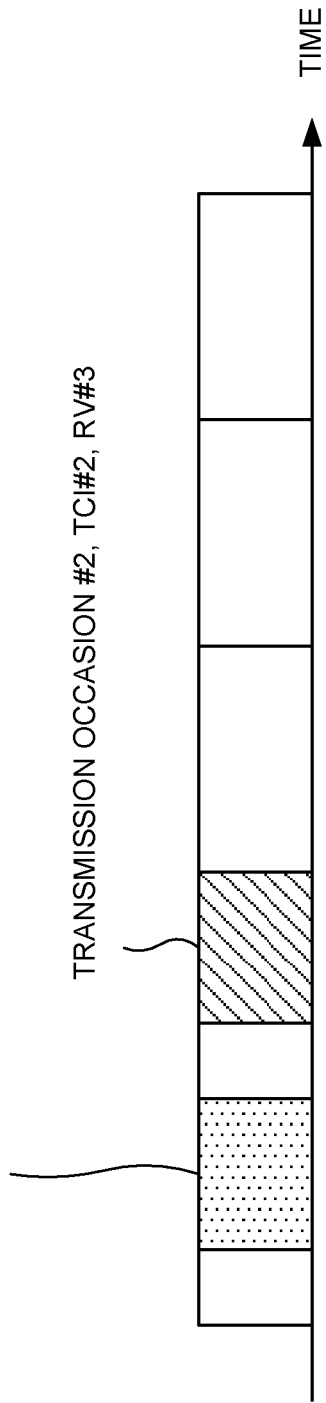

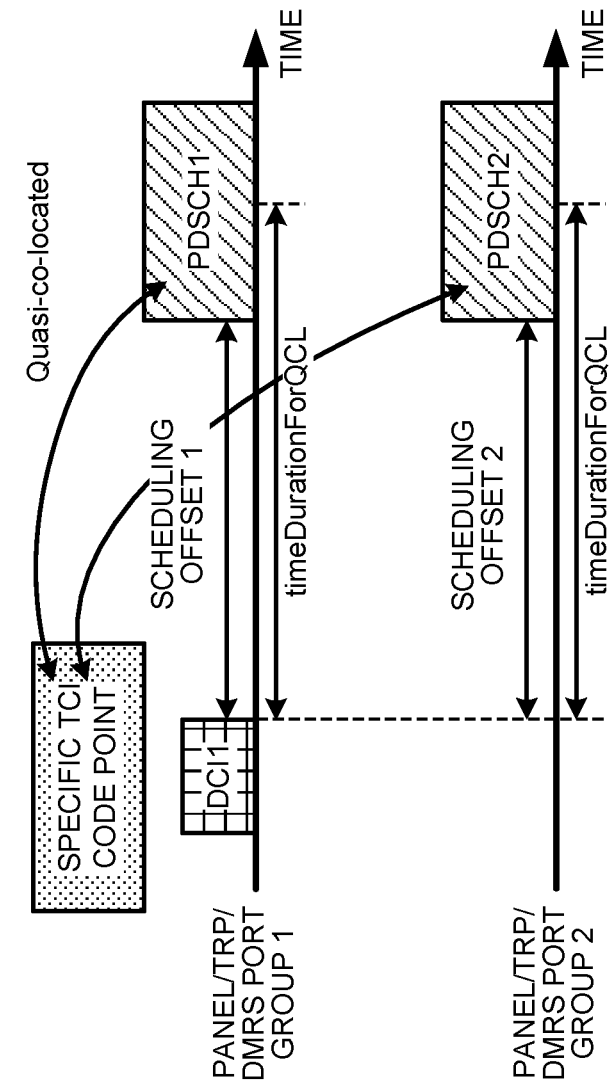

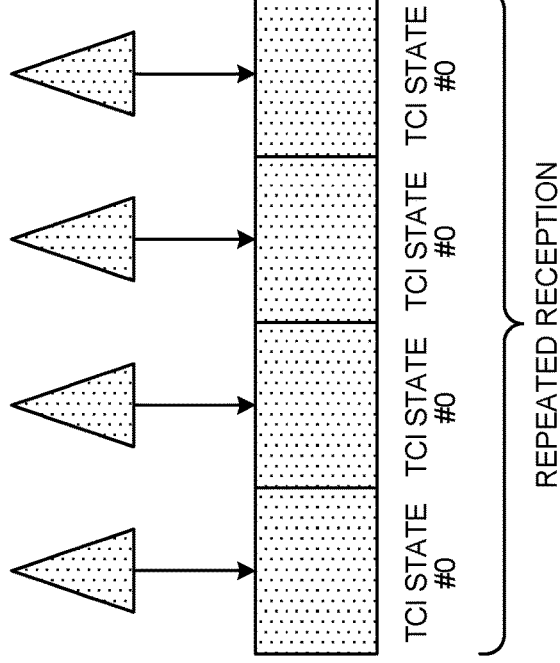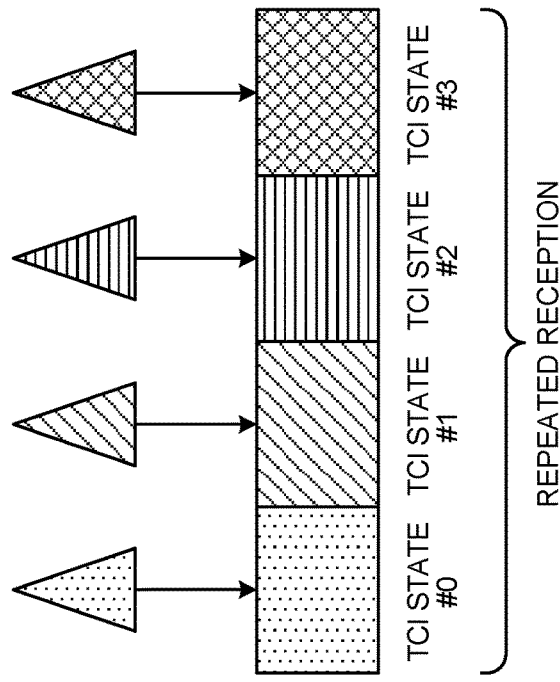
FIG. 15A
FIG. 15B

| Index | TCI STATE ID |
|---|---|
| 1 | #0 |
| 2 | #1 |
| 3 | #2 |
| 4 | #3 |

FIG. 16

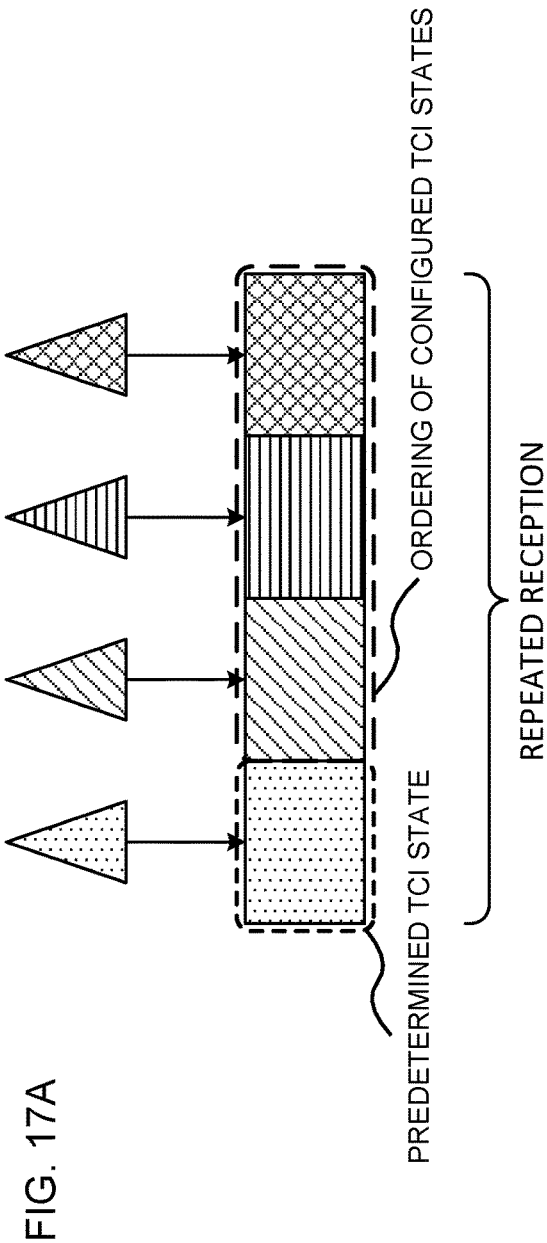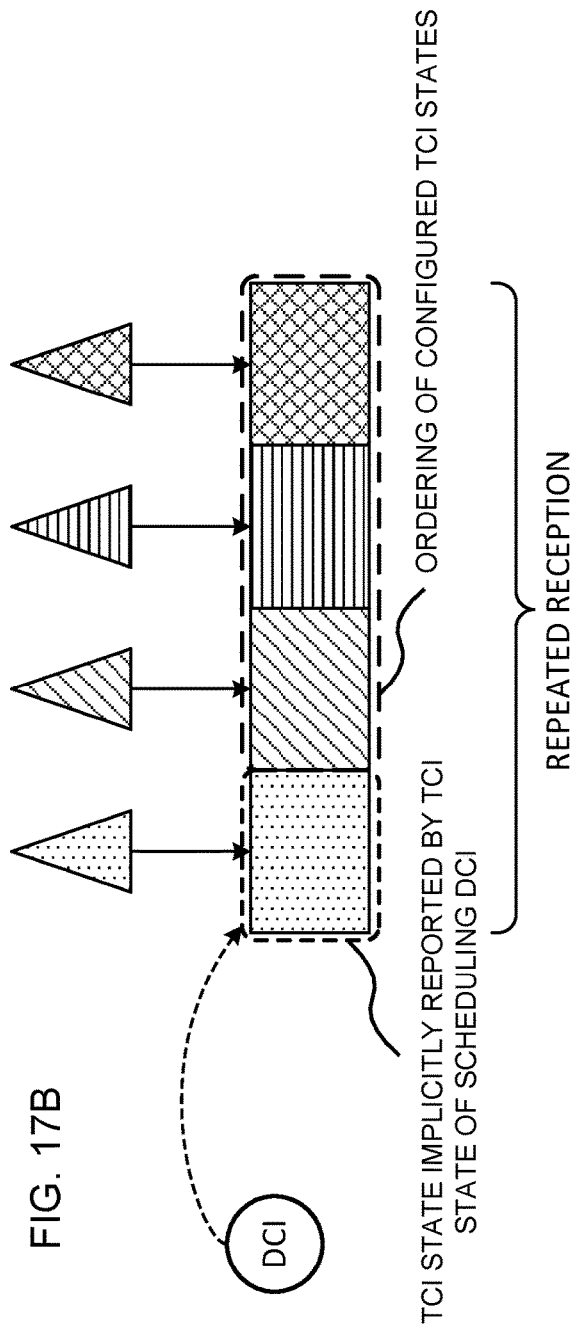
FIG. 17A
FIG. 17B

| Ordering index | BEAM ID |
|---|---|
| 1 | #1 |
| 2 | #2 |
| 3 | #3 |
| 4 | #4 |

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), a scheme in which a user terminal (User Equipment (UE)) controls reception processing, based on information related to quasi-co-location (QCL) is under study.

In NR, a scheme in which one or a plurality of transmission/reception points (TRPs) (multi-TRPs) perform DL transmission (for example, PDSCH transmission) to the UE by using one or a plurality of panels (multi-panels) is under study.

However, in NR specifications so far, the multi-panels/TRPs are not considered, and thus a QCL parameter when the multi-panels/TRPs are used cannot be appropriately determined. Failing to appropriately determine the QCL parameter may lead to deterioration of system performance, such as deterioration of throughput.

In view of this, the present disclosure has one object to provide a terminal, a radio communication method, and a base station that appropriately determine a QCL parameter for multi-panels/TRPs.

Solution to Problem

A terminal according to an aspect of the present disclosure includes a control section that determines one or more default transmission configuration indication (TCI) states to be applied to respective reception occasions of repeated reception of a downlink shared channel (Physical downlink Shared Channel (PDSCH)), and a receiving section that carries out the repeated reception by using a spatial domain reception filter based on the one or more default TCI states.

Advantageous Effects of Invention

According to an aspect of the present disclosure, a QCL parameter for multi-panels/TRPs can be appropriately determined.

BRIEF DESCRIPTION OF DRAWINGS

FIG. 7A and FIG. 7B are each a diagram to show an example of a scheme 2b of PDSCH repetition;

FIG. 8A and FIG. 8B are diagrams to show examples of schemes 3 and 4 of PDSCH repetition;

FIG. 9A and FIG. 9B are each a diagram to show an example of a determination method of a QCL parameter of multi-PDSCHs;

FIG. 15A and FIG. 15B are each a diagram to show an example of a default TCI state of repeated reception;

FIG. 16 is a diagram to show an example of ordering of TCI state IDs according to embodiment 2.2.2;

FIG. 17A and FIG. 17B are each a diagram to show an example of a default TCI state according to embodiment 2.2.3;

DESCRIPTION OF EMBODIMENTS (Repeated Reception)

Figure 1:
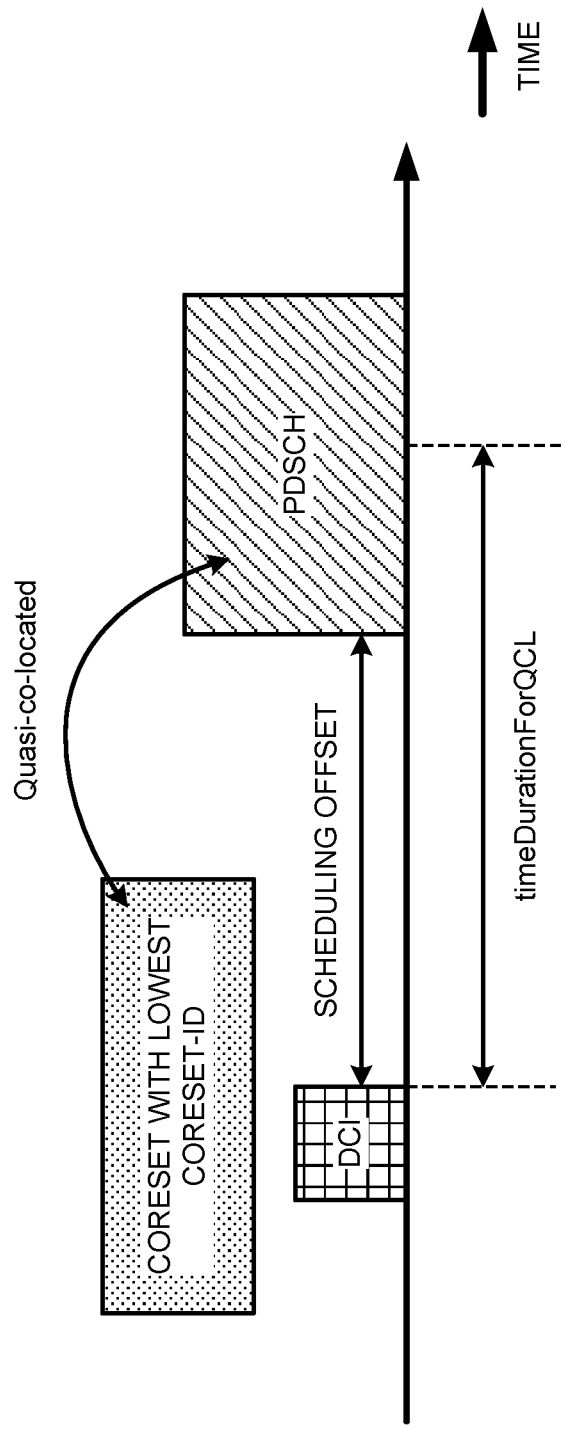
FIG. 1 is diagram to show an example of QCL assumption of a DMRS port of a PDSCH.

In Rel. 16, repeated reception is supported in data reception. For example, a base station (network (NW), gNB) may repeatedly transmit DL data (for example, a downlink shared channel (PDSCH)) a certain number of times. Alternatively, the UE may repeat UL data (for example, an uplink shared channel (PUSCH)) a certain number of times.

The UE may be scheduled with a certain number of repeated PDSCH reception by a single piece of DCI. The number of times of repetition is also referred to as a repetition factor K or an aggregation factor K.

The n-th repetition may also be referred to as n-th reception occasion or the like, and may be identified by a repetition index k ($0 \leq k \leq K-1$).

The UE semi-statically receives information (for example, aggregationFactorUL or aggregationFactorDL) indicating the repetition factor K by higher layer signaling. Here, the higher layer signaling may be, for example, any one of or a combination of RRC (Radio Resource Control) signaling, MAC (Medium Access Control) signaling, broadcast information, and the like.

For example, the MAC signaling may use MAC control elements (MAC CEs), MAC PDUs (Protocol Data Units), and the like. For example, the broadcast information may be master information blocks (MIBs), system information blocks (SIBs), minimum system information (RMSI (Remaining Minimum System Information)), and the like.

The UE controls reception processing (for example, at least one of reception, demapping, demodulation, and decoding) of the PDSCH or transmission processing (for example, at least one of transmission, mapping, modulation, and coding) of the PUSCH in K consecutive slots, based on at least one of the following field values (pieces of information indicated by the field values) in the DCI:

Allocation of time domain resources (for example, a start symbol, number of symbols in each slot, or the like),
Allocation of frequency domain resources (for example, a certain number of resource blocks (RBs), or a certain number of resource block groups (RBGs)),
Modulation and coding scheme (MCS) index,
Configuration of a demodulation reference signal (DMRS) of a PDSCH/PUSCH, and
Spatial relation information (spatial relation info) of a PDSCH/PUSCH, or a transmission configuration indication or transmission configuration indicator (TCI) state (TCI state (TCI-state)).

Among K consecutive slots, the same symbol mapping may be applied. The UE may determine symbol mapping in each slot, based on a start symbol S and a number L of symbols (for example, Start and Length Indicator (SLIV)) being determined based on a value m of a certain field (for example, a time domain resource allocation (TDRA) field) in the DCI. Note that the UE may determine the first slot, based on K2 information determined based on the value m of the certain field (for example, the TDRA field) in the DCI.

On the other hand, among the K consecutive slots, a redundancy version (RV) applied to a TB based on the same data may be the same or may be at least partially different from each other. For example, the RV applied to the TB in the n-th slot (reception occasion, repetition) may be determined based on a value of a certain field (for example, an RV field) in the DCI.

(TCI, QCL)

For NR, control of reception processing (for example, at least one of reception, demapping, demodulation, and decoding) and transmission processing (for example, at least one of transmission, mapping, precoding, modulation, and coding) in the UE regarding at least one of a signal and a channel (expressed as a signal/channel), based on the transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of a Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread,
QCL type B (QCL-B): Doppler shift and Doppler spread,
QCL type C (QCL-C): Doppler shift and average delay, and
QCL type D (QCL-D): Spatial reception parameter.

A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

The UE may receive configuration information (for example, PDSCH-Config or tci-StatesToAddModList) including a list of information elements of the TCI state by using higher layer signaling.

An information element of the TCI state ("TCI-state IE" of RRC) configured using higher layer signaling may include a TCI state ID and one or a plurality of pieces of QCL information ("QCL-Info"). The QCL information may include at least one of information related to the RS to have a QCL relationship (RS relation information) and information indicating a QCL type (QCL type information). The RS relation information may include information such as an index of the RS (for example, an SSB index, or a non-zero power CSI-RS (NZP CSI-RS) resource ID (Identifier)), an index of a cell in which the RS is located, and an index of a Bandwidth Part (BWP) in which the RS is located.

In Rel-15 NR, as the TCI state of at least one of the PDCCH and the PDSCH, both of the RS of QCL type A and the RS of QCL type D, or only the RS of QCL type A may be configured for the UE.

In a case where the TRS is configured as the RS for the QCL type A, unlike a demodulation reference signal (DMRS) for the PDCCH or the PDSCH, the TRS is assumed to be transmitted such that the same TRS is periodically transmitted for an extended period of time. The UE can measure the TRS and calculate the average delay, the delay spread, and the like.

In a case where, for the UE, the TRS is configured as the RS for the QCL type A, in the TCI state of the DMRS for the PDCCH or the PDSCH, the UE can assume that the DMRS for the PDCCH or the PDSCH is the same as the QCL type A parameters (average delay, delay spread, and the like) for the TRS. Thus, the type A parameters (average delay, delay spread, and the like) for the DMRS for the PDCCH or the PDSCH can be determined from measurement results for the TRS. When performing channel estimation for at least one of the PDCCH and the PDSCH, the UE can use the measurement results for the TRS to perform more accurate channel estimation.

In a case where the RS for the QCL type D is configured for the UE, the UE can use the RS for the QCL type D to determine a UE receive beam (spatial domain reception filter, and UE spatial domain reception filter).

The RS for QCL type X for the TCI state may mean the RS in the QCL type X relation with (the DMRS for) a certain channel/signal, and the RS may be referred to as a QCL source of the QCL type X for the TCI state.

<TCI State for PDCCH>

Information related to the QCL between the PDCCH (or a DMRS antenna port related to the PDCCH) and a certain RS may be referred to as a TCI state for the PDCCH or the like.

The UE may determine the TCI state for a UE-specific PDCCH (CORESET), based on higher layer signaling. For example, one or a plurality (K) of TCI states may be configured for the UE for each CORESET by using RRC signaling.

For the UE, for each CORESET, one of the plurality of TCI states configured by using RRC signaling may be activated by using the MAC CE. The MAC CE may be referred to as a TCI state indication MAC CE for a UE-specific PDCCH (TCI State Indication for UE-specific PDCCH MAC CE). The UE may perform monitoring of the CORESET, based on an active TCI state corresponding to the CORESET.

<TCI State for PDSCH>

Information related to the QCL between the PDSCH (or a DMRS antenna port related to the PDSCH) and a certain DL-RS may be referred to as a TCI state for the PDSCH or the like.

M (M≥1) TCI states for the PDSCH (M pieces of QCL information for the PDSCH) may be reported (configured) for the UE by using higher layer signaling. Note that the number M of TCI states configured for the UE may be restricted by at least one of UE capability and the QCL type.

The DCI used for scheduling of the PDSCH may include a field (which may be referred to as, for example, a TCI field, a TCI state field, or the like) indicating the TCI state for the PDSCH. The DCI may be used for scheduling of the PDSCH of one cell, and may be referred to as, for example, DL DCI, DL assignment, DCI format 1_0, DCI format 1_1, or the like.

Whether or not the TCI field is included in the DCI may be controlled with information reported from the base station to the UE. The information may be information (for example, TCI field presence information, information of TCI presence in DCI, the higher layer parameter TCI-PresentInDCI) indicating whether the TCI field is present or absent in the DCI. The information may be, for example, configured for the UE by using higher layer signaling.

When more than eight types of TCI states are configured for the UE, eight or less types of TCI states may be activated (or specified), using the MAC CE. The MAC CE may be referred to as a TCI state activation/deactivation MAC CE for a UE-specific PDSCH (TCI States Activation/Deactivation for UE-specific PDSCH MAC CE). The value of the TCI field in the DCI may indicate one of the TCI states activated using the MAC CE.

When the TCI field presence information set as "enabled" is configured for the UE for the CORESET for scheduling the PDSCH (CORESET used for PDCCH transmission for scheduling the PDSCH), the UE may assume that the TCI field is present in DCI format 1_1 of the PDCCH transmitted on the CORESET.

In a case in which the TCI field presence information is not configured for the CORESET for scheduling the PDSCH or the PDSCH is scheduled by DCI format 1_0, when a time offset between reception of the DL DCI (DCI for scheduling the PDSCH) and reception of the PDSCH corresponding to the DCI is equal to or larger than a threshold, in order to determine the QCL of a PDSCH antenna port, the UE may assume that the TCI state or the QCL assumption for the PDSCH is the same as the TCI state or the QCL assumption applied to the CORESET used for PDCCH transmission for scheduling the PDSCH.

In a case in which the TCI field presence information is set as "enabled," when the TCI field in the DCI in a component carrier (CC) for scheduling (the PDSCH) indicates an activated TCI state in the scheduled CC or a DL BWP, and the PDSCH is scheduled by DCI format 1_1, in order to determine the QCL of the PDSCH antenna port, the UE may use the TCI in accordance with the value of the TCI field in the detected PDCCH having the DCI. When the time offset between reception of the DL DCI (for scheduling the PDSCH) and the PDSCH corresponding to the DCI (PDSCH scheduled by the DCI) is equal to or larger than the threshold, the UE may assume that the DM-RS port of the PDSCH of the serving cell is quasi co-located (QCLed) with the RS in the TCI state related to a QCL type parameter given by the indicated TCI state.

When a single slot PDSCH is configured for the UE, the indicated TCI state may be based on the activated TCI state in the slot having the scheduled PDSCH. When a plurality of slot PDSCHs are configured for the UE, the indicated TCI state may be based on the activated TCI state in the first slot having the scheduled PDSCH, and the UE may expect that the TCI state is the same over the slots having the scheduled PDSCH. When the CORESET associated with the search space set for cross carrier scheduling is configured for the UE, the TCI field presence information is set to "enabled" for the UE for the CORESET, and when at least one of the TCI states configured for the serving cell scheduled by the search space set includes QCL type D, the UE may assume that the time offset between a detected PDCCH and the PDSCH corresponding to the PDCCH is equal to or larger than the threshold.

In both of a case in which the information of TCI in DCI (higher layer parameter TCI-PresentInDCI) is set to "enabled" and a case in which the TCI information in DCI is not configured in an RRC connected mode, when the time offset between reception of the DL DCI (DCI for scheduling the PDSCH) and its corresponding PDSCH (PDSCH scheduled by the DCI) is less than the threshold, the UE may assume that the DM-RS port of the PDSCH of the serving cell has the lowest (minimum) CORESET-ID in the latest (most recent) slot in which one or more CORESETs in the active BWP of the serving cell are monitored by the UE, and is quasi co-located with the RS related to the QCL parameter used for QCL indication of the PDCCH of the CORESET associated with the monitored search space (FIG. 1). The RS may be referred to as a default TCI state of the PDSCH or a default QCL assumption of the PDSCH.

The time offset between the reception of the DL DCI and the reception of the PDSCH corresponding to the DCI may be referred to as a scheduling offset.

The threshold may be referred to as time duration for QCL, a "timeDurationForQCL," a "Threshold," a "Threshold for offset between a DCI indicating a TCI state and a PDSCH scheduled by the DCI," a "Threshold-Sched-Offset," a schedule offset threshold, a scheduling offset threshold, or the like.

The time duration for QCL may be based on the UE capability, and may be, for example, based on a delay that is required for decoding of the PDCCH and beam switching. The time duration for QCL may be a minimum period of time that is required for the UE to perform PDCCH reception and application of spatial QCL information received in the DCI for PDSCH processing. The time duration for QCL may be represented by the number of symbols for each subcarrier spacing, or may be represented by time (for example, µs). Information of the time duration for QCL may be reported from the UE to the base station as UE capability information, or may be configured from the base station to the UE by using higher layer signaling.

For example, the UE may assume that the DMRS port of the PDSCH is quasi co-located with the DL-RS that is based on the TCI state activated for the CORESET corresponding to the minimum CORESET-ID. The latest slot may be, for example, a slot in which the DCI for scheduling the PDSCH is received.

Note that the CORESET-ID may be an ID configured by using the RRC information element "ControlResourceSet" (ID for identification of the CORESET, controlResourceSetId).

When the CORESET is not configured for a CC, the default TCI state may be an activated TCI state having the lowest ID that can be applied to the PDSCH in the active DL BWP of the CC.

In Rel. 16 or later versions, in a case (cross carrier scheduling) in which the PDSCH and the PDCCH for scheduling the PDSCH are present in different component carriers (CCs), when delay from the PDCCH to the PDSCH (PDCCH-to-PDSCH delay) is smaller than the time duration for QCL, or when the TCI state is not present in the DCI for the scheduling, the UE may acquire QCL assumption for the PDSCH scheduled from the active TCI state that can be applied to the PDSCH in the active BWP of the scheduled cell and that has the lowest ID.

(Services (Traffic Types))

In future radio communication systems (for example, NR), traffic types (also referred to as types, services, service types, communication types, use cases, or the like), such as further enhancement of mobile broadband (for example, enhanced Mobile Broadband (eMBB)), machine type communication that implements multiple simultaneous connection (for example, massive Machine Type Communications (mMTC), Internet of Things (IoT)), and highly-reliable and low-latency communication (for example, Ultra-Reliable and Low-Latency Communications (URLLC)), are assumed. For example, in URLLC, lower latency and higher reliability in comparison to eMBB are required.

The traffic type may be identified based on at least one of the following in a physical layer.
Logical channel having different priority
Modulation and coding scheme (MCS) table (MCS index table)
Channel quality indication (CQI) table
DCI format
Radio network temporary identifier (RNTI), for example, System Information (SI)-RNTI) used for scrambling (masking) of cyclic redundancy check (CRC) bits included in (added to) the DCI (DCI format)
RRC (Radio Resource Control) parameter
Specific RNTI (for example, an RNTI for URLLC, an MCS-C-RNTI, or the like)
Search space
Field in DCI (for example, a newly added field or reuse of an existing field)

The traffic type may be associated with communication requirements (requirements such as latency and an error rate, a required condition), a data type (voice, data, or the like), and the like.

The difference between requirements of URLLC and requirements of eMBB may be that latency of URLLC is lower than latency of eMBB, or may be that the requirements of URLLC include requirements of reliability.

(Multi-TRPs)

For NR, a scheme in which one or a plurality of transmission/reception points (TRPs) (multi-TRPs) perform DL transmission to the UE by using one or a plurality of panels (multi-panels) is under study. Further, a scheme in which the UE performs UL transmission to one or a plurality of TRPs is under study.

Figure 2:
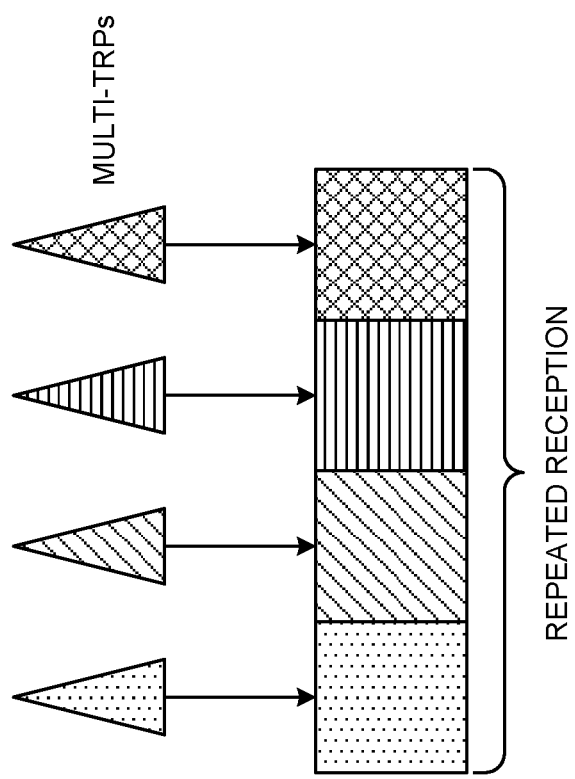
FIG. 2 is a diagram to show an example of performing repeated DL reception using a plurality of reception occasions for a plurality of TRPs.

FIG. 2 shows an example of performing repeated DL reception, in which the UE uses four reception occasions for four TRPs. The reception occasion may be a unit of repeated reception. To the plurality of reception occasions, at least one of time division multiplexing (TDM), frequency division multiplexing (FDM), space division multiplexing (SDM), and the like may be applied. The reception occasion may be interchangeably interpreted as a reception occasion, an Rx occasion, or the like.

Note that the plurality of TRPs may correspond to the same cell identifier (ID), or may correspond to different cell IDs. The cell ID may be a physical cell ID, or may be a virtual cell ID.

FIGS. 3A to 3D are each a diagram to show an example of a multi-TRP scenario. In these examples, it is assumed that each TRP can transmit four different beams. However, this is not restrictive.

Figure 3B:
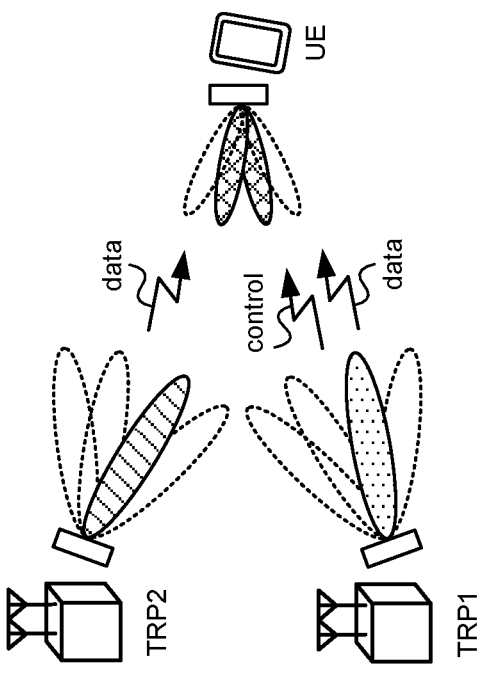
FIGS. 3A to 3D are each a diagram to show an example of a multi-TRP scenario.
Figure 3D:
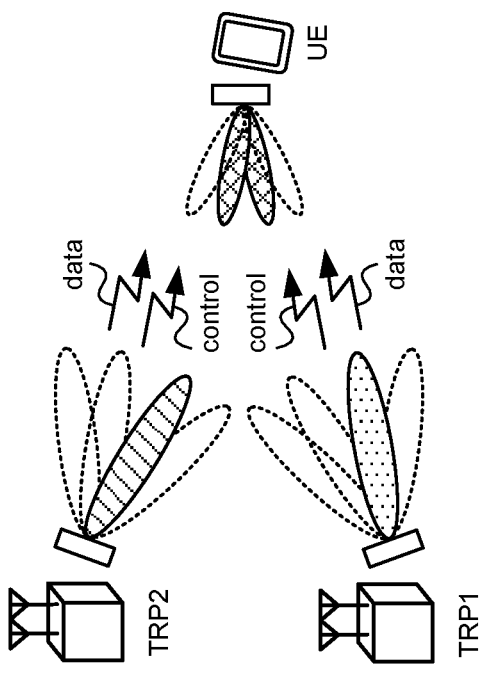
Figure 3A:
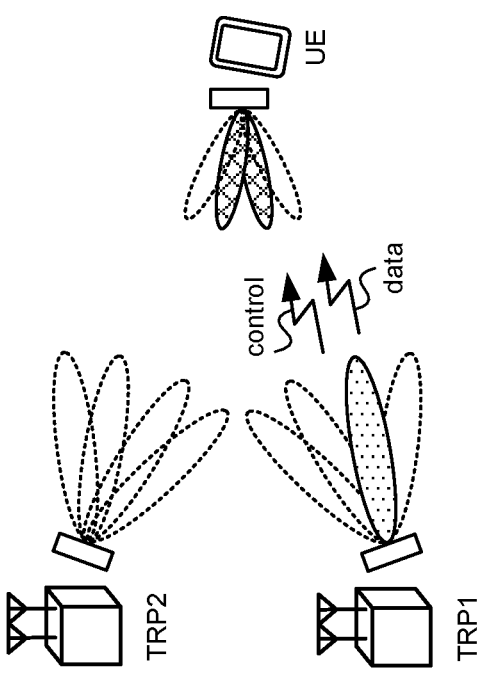

FIG. 3A shows an example of a case (which may be referred to as a single mode, a single TRP, or the like) in which only one TRP (in the present example, TRP 1) out of the multi-TRPs performs transmission to the UE. In this case, TRP 1 transmits both of a control signal (PDCCH) and a data signal (PDSCH) to the UE.

FIG. 3B shows an example of a case (which may be referred to as a single master mode) in which only one TRP (in the present example, TRP 1) out of the multi-TRPs transmits a control signal to the UE, and the multi-TRPs transmit a data signal thereto. The UE receives each PDSCH transmitted from the multi-TRPs, based on one piece of downlink control information (DCI).

Figure 3C:
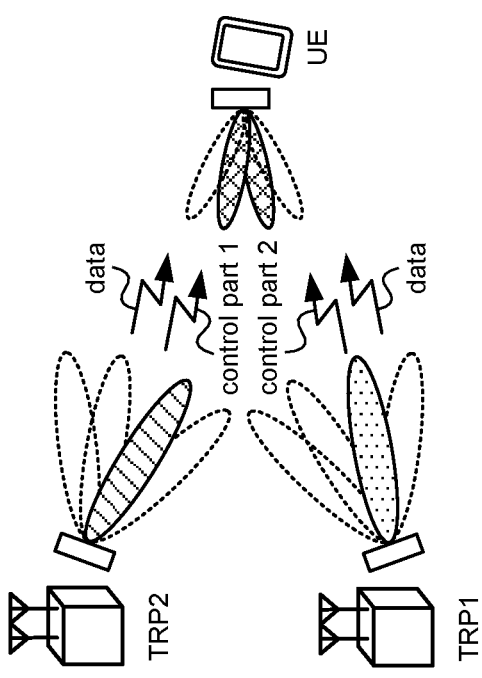

FIG. 3C shows an example of a case (which may be referred to as a master slave mode) in which each of the multi-TRPs transmits a part of a control signal to the UE, and the multi-TRPs transmit a data signal thereto. In TRP 1, part 1 of a control signal (DCI) may be transmitted, and in TRP 2, part 2 of the control signal (DCI) may be transmitted. Part 2 of the control signal may depend on part 1. The UE receives each PDSCH transmitted from the multi-TRPs, based on these parts of the DCI.

FIG. 3D shows an example of a case (which may be referred to as a multi-master mode) in which each of the multi-TRPs transmits different control signals to the UE, and the multi-TRPs transmit data signals thereto. In TRP 1, a first control signal (DCI) may be transmitted, and in TRP 2, a second control signal (DCI) may be transmitted. The UE receives each PDSCH transmitted from the multi-TRPs, based on these pieces of DCI.

When a plurality of PDSCHs (which may be referred to as multi-PDSCHs (multiple PDSCH)) from the multi-TRPs as shown in FIG. 3B are scheduled using one piece of DCI, the piece of DCI may be referred to as single DCI (S-DCI, single PDCCH). When a plurality of PDSCHs from the multi-TRPs as shown in FIG. 3D are each scheduled using a plurality of pieces of DCI, the plurality of pieces of DCI may be referred to as multi-DCIs (M-DCI, multi-PDCCHs (multiple PDCCH)).

From respective TRPs of the multi-TRPs, codewords (Code Words (CWs)) and layers different from one another may be transmitted. As one mode of multi-TRP transmission, non-coherent joint transmission (NCJT) is under study.

In NCJT, for example, TRP 1 performs modulation mapping and layer mapping on a first codeword to transmit a first PDSCH by using a first number of layers (for example, two layers) by means of first precoding. TRP 2 performs modulation mapping and layer mapping on a second codeword to transmit a second PDSCH by using a second number of layers (for example, two layers) by means of second precoding.

Note that it may be defined that a plurality of PDSCHs (multi-PDSCHs) to be transmitted using NCJT partially or entirely overlap regarding at least one of the time and frequency domains. In other words, at least one of the time and frequency resources of the first PDSCH from the first TRP and the second PDSCH from the second TRP may overlap.

It may be assumed that the first PDSCH and the second PDSCH are not in a quasi-co-location (QCL) relationship (not quasi-co-located). Reception of the multi-PDSCHs may be interpreted as simultaneous reception of the PDSCHs that are not of a certain QCL type (for example, QCL type D).

(PDSCH Repetition Across Multi-TRPs)

Support of PDSCH repetition (PDSCH repetitions) across the multi-TRPs is under study. At least one of the following repetition schemes across the multi-TRPs may be supported in a frequency domain, a layer (spatial) domain, or a time domain.

Repetition employing space division multiplexing (SDM): Scheme 1a (SDM scheme)

Repetition employing frequency division multiplexing (FDM): Schemes 2a (FDM scheme A) and 2b (FDM scheme B)

Repetition employing time division multiplexing (TDM): Schemes 3 (TDM scheme A) and 4 (TDM scheme B)

At least one of these schemes may be supported for URLLC.

Figure 4:
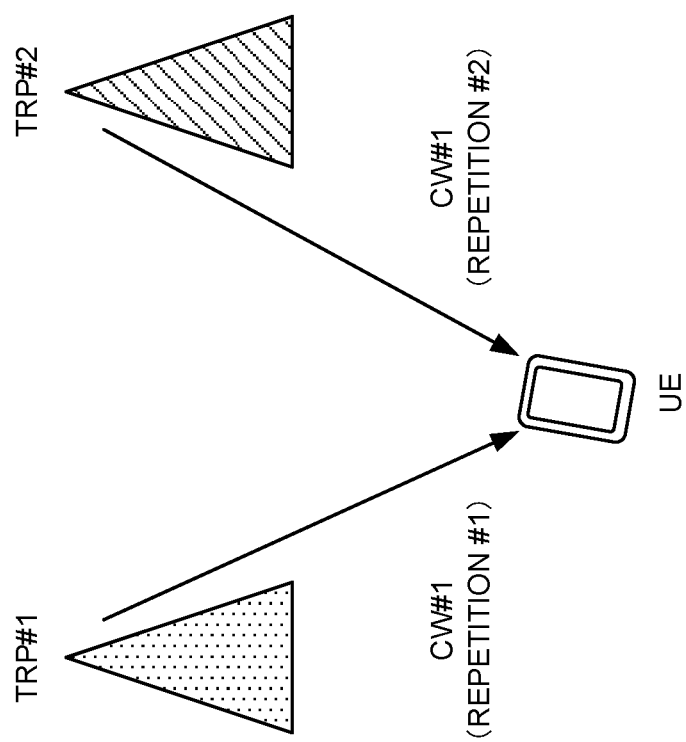
FIG. 4 is a diagram to show an example of PDSCH repetition from multi-TRPs.

For example, as shown in FIG. 4, as the PDSCH repetition, repetitions #1 and #2 of codeword (CW) #1 are respectively transmitted from TRP #1 and TRP #2.

[Scheme 1a]

In this scheme, in a single slot, n (n<=$N_s$ (the number of spatial resources, the number of layers, the number of layer sets)) TCI states may be used, and overlapped time and frequency resource allocation may be used. Each reception occasion may be one layer, or one set (layer set) of layers of the same transport block (TB). Each layer or layer set may be associated with one TCI state and one set of DMRS ports. A single codeword with one redundancy version (RV) may be used across all of the spatial layers or layer sets. From the viewpoint of the UE, different coding bits are mapped to different layers or different layer sets, using the same mapping rule as that of Rel. 15.

Figure 5:
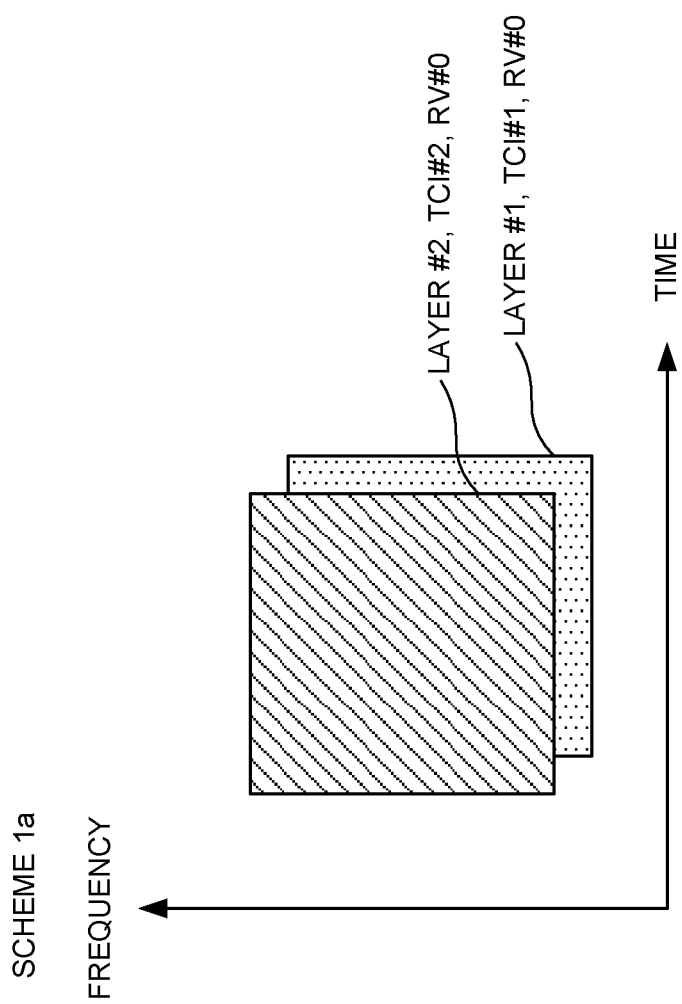
FIG. 5 is a diagram to show an example of a scheme 1a of PDSCH repetition.

For example, as shown in FIG. 5, repetitions #1 and #2 of FIG. 4 are respectively mapped to layers #1 and #2 in time and frequency resources overlapped with each other. The UE receives repetition #1 using TCI state #1 and RV #0, and receives repetition #2 using TCI state #2 and RV #0. For repetitions #1 and #2, different TCI states and the same RV are used.

[Scheme 2]

In this scheme, in a single slot, n (n<=$N_f$ (the number of frequency resources)) TCI states may be used, and non-overlapped frequency resource allocation may be used. Each non-overlapped frequency resource allocation may be associated with one TCI state. The same single or multiple DMRS ports may be associated with all of the non-overlapped frequency resource allocations.

[[Scheme 2a]]

A single codeword with one RV may be used across the entire resource allocation. From the viewpoint of the UE, common resource block (RB) mapping (mapping from a codeword to a layer the same as that of Rel. 15) may be applied across the entire resource allocation.

[[Scheme 2b]]

A single codeword with one RV may be used for each non-overlapped frequency resource allocation. The RV corresponding to each non-overlapped frequency resource allocation may be the same or different from each other.

[[Frequency Resource Allocation]]

The frequency resource allocation may be comb-like frequency resource allocation between the multi-TRPs. For a wideband precoding resource block group (PRG), the first ceil($N_{RB}/2$) RBs may be allocated to TCI state 1, and the rest of floor($N_{RB}/2$) RBs may be allocated to TCI state 2. For PRG size=2 or 4, the PRGs having even-numbered indices in allocated frequency domain resource allocation (FDRA) may be allocated to TCI state 1, and the PRGs having odd-numbered indices in the allocated FDRA may be allocated to TCI state 2.

Precoder granularity P (PRG size) may be one of values of {2, 4, wideband}. When P is 2 or 4, the PRG divides the BWP by P consecutive PRBs.

Figure 6B:
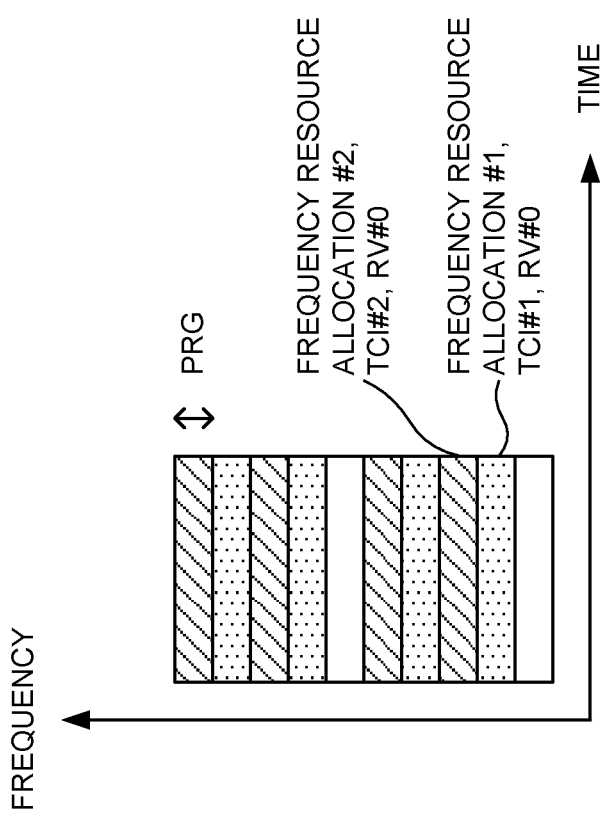
FIG. 6A and FIG. 6B are each a diagram to show an example of a scheme 2a of PDSCH repetition.
Figure 6A:
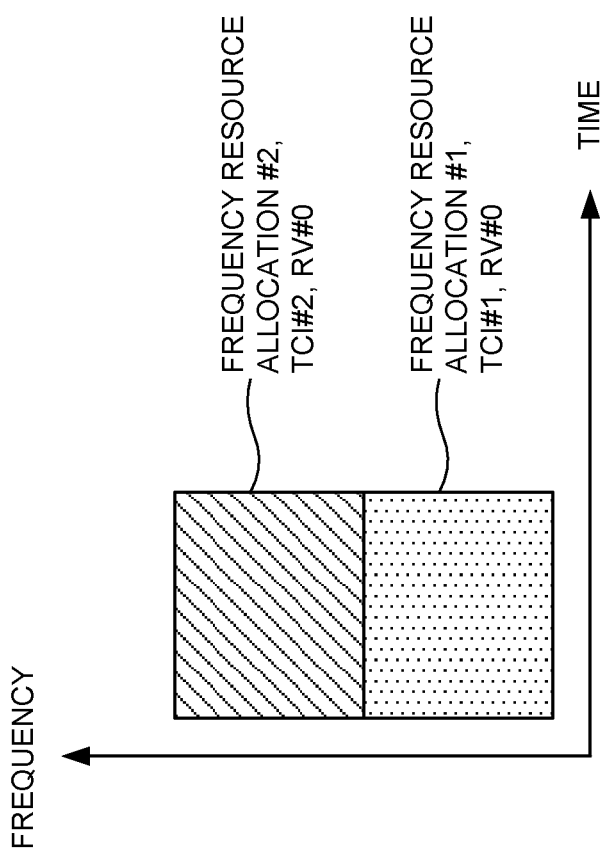

When the scheme 2a is used, for example, as shown in FIG. 6A and FIG. 6B, repetitions #1 and #2 of FIG. 4 are respectively mapped to non-overlapped frequency resource allocations #1 and #2 in time resources overlapped with each other. The UE receives repetition #1 using TCI state #1 and RV #0, and receives repetition #2 using TCI state #2 and RV #0. For repetitions #1 and #2, different TCI states and the same RV are used.

When the scheme 2b is used, for example, as shown in FIG. 7A and FIG. 7B, repetitions #1 and #2 of FIG. 4 are respectively mapped to non-overlapped frequency resource allocations #1 and #2 in time resources overlapped with each other. The UE receives repetition #1 using TCI state #1 and RV #0, and receives repetition #2 using TCI state #2 and RV #3. For repetitions #1 and #2, different TCI states and different RVs are used.

As shown in FIG. 6A and FIG. 7A, when the precoder granularity is a wideband (a wideband PRG is used), non-overlapped frequency resource allocation #1 corresponds to the first half of consecutive PRBs of the BWP, and non-overlapped frequency resource allocation #2 corresponds to the last half of consecutive PRBs of the BWP. As shown in FIG. 6B and FIG. 7B, when the precoder granularity is 2 or 4 (the PRG size is 2 or 4), non-overlapped frequency resource allocation #1 corresponds to the PRGs having even-numbered indices, and non-overlapped frequency resource allocation #2 corresponds to the PRGs having odd-numbered indices.

[Scheme 3]

In this scheme, in a single slot, n (n<=$N_{t1}$ (the number of time resources)) TCI states may be used, and non-overlapped time resource allocation may be used. Each reception occasion of the TB may use time granularity of a mini-slot, and have one TCI state and one RV. All of the reception occasions in a slot may use a common MCS having the same single or multiple DMRS ports. At least one of the RV and the TCI state may be the same or different among a plurality of reception occasions.

For example, as shown in FIG. 8A, repetitions #1 and #2 of FIG. 4 are respectively mapped to reception occasions #1 and #2 in one slot. The UE receives repetition #1 using TCI state #1 and RV #0, and receives repetition #2 using TCI state #2 and RV #3. For repetitions #1 and #2, different TCI states and different RVs are used.

[Scheme 4]

In this scheme, in K (n<=K) different slots, n (n<=$N_{t2}$ (the number of time resources)) TCI states may be used. Each reception occasion of the TB may have one TCI state and one RV. All of the reception occasions across the K slots may have a common MCS having the same single or multiple DMRS ports. At least one of the RV and the TCI state may be the same or different among a plurality of reception occasions.

For example, as shown in FIG. 8B, repetitions #1 and #2 of FIG. 4 are respectively mapped to reception occasion #1 in the first slot and reception occasion #2 in the second slot. The UE receives repetition #1 using TCI state #1 and RV #0, and receives repetition #2 using TCI state #2 and RV #3. For repetitions #1 and #2, different TCI states and different RVs are used.

According to the multi-TRP scenario as described above, more flexible transmission control using a channel with satisfactory quality can be performed.

NCJT using multi-TRPs/panels may use a high rank. In order to support ideal and non-ideal backhauls among a plurality of TRPs, both of the single DCI (single PDCCH) and the multi-DCIs (multi-PDCCHs) may be supported. For both of the single DCI and the multi-DCIs, the maximum number of TRPs may be 2.

For single PDCCH design (mainly for the ideal backhaul), enhancement of the TCI is under study. Each TCI code point in the DCI may correspond to one or two TCI states. A TCI field size may be the same as that in Rel. 15.

For single PDCCH design (mainly for the ideal backhaul), enhancement of the DMRS is under study. The UE may support the following combinations of layers from two TRPs indicated by an antenna port field. For a single codeword (CW) and a single user (SU), the combination of the number of layers of TRP 1 and TRP 2 may be any one of 1+1, 1+2, 2+1, and 2+2, when being shown in the form of "number of layers of TRP 1+number of layers of TRP 2." Support of at least one layer combination of 1+3 and 3+1 from two TRPs indicated by the antenna port field, support for a multi-user (MU) case, and support for two CWs, are not agreed upon. The size of the antenna port field may be the same as that in Rel. 15.

For multi-PDCCH design (for both of the ideal backhaul and the non-ideal backhaul), the maximum number of CORESETs for each piece of PDCCH configuration information (PDCCH-Config) may be increased to 5 in accordance with UE capability. The maximum number of CORESETs that may be configured with the same TRP may be up to the number reported by the UE capability. The same TRP may correspond to the same higher layer index (for example, CORESET pool index) configured for each piece of PDCCH configuration information or for each CORESET if configured. The UE capability may include at least three candidate values.

For multi-PDCCH design (for both of the ideal backhaul and the non-ideal backhaul), the maximum number of resources of at least one of a BD and a CCE for each serving cell or for each slot may be increased depending on the UE capability.

For only multi-PDCCH-based design, enhancement of the PDSCH is under study.

The total number of CWs in a plurality of scheduled PDSCHs may be up to 2. Each PDSCH is scheduled by one PDCCH. The total number of multi-input multi-output (MIMO) layers of the scheduled PDSCHs may be up to the number reported by MIMO capability of the UE. Increasing the maximum number of HARQ processes in Rel. 16 is not agreed upon.

The UE may support different PDSCH scrambling sequences for a plurality of PDSCHs. The UE may support enhancement of RRC configuration for configuring a plurality of dataScramblingIdentityPDSCHs. Each dataScramblingIdentityPDSCH may be associated with a higher layer index (CORESET pool index) for each CORESET, and may be applied to the PDSCH scheduled using the DCI detected on the CORESET having the same higher layer index.

For PDSCH resource allocation, in the time and frequency domains, the UE may support a plurality of PDSCHs being at least one of "fully overlapped," "partially overlapped," and "non-overlapped."

Regarding rate matching, for an LTE cell-specific RS (cell-specific reference signal (CRS)), CRS pattern information (lte-CRS-ToMatchAround) for a plurality of CRS patterns in the serving cell to be configured may be enhanced. The CRS pattern information is a parameter for determining the CRS pattern, and the UE may perform rate matching around the CRS pattern.

For only multi-PDCCH-based design, enhancement of the PUCCH is under study.

Both of joint ACK/NACK (HARQ-ACK) feedback and separate ACK/NACK feedback may be supported. RRC signaling may be used for switching between the joint feedback and the separate feedback. For the joint ACK/NACK feedback, both of a semi-static HARQ-ACK codebook and a dynamic HARQ-ACK codebook may be supported. For the separate ACK/NACK feedback, the higher layer index for each CORESET used for generation of separated HARQ-ACK codebooks may be configured, both of the semi-static HARQ-ACK codebook and the dynamic HARQ-ACK codebook may be supported, two long PUCCCHs multiplexed by TDM in one slot may be supported, a short PUCCH and a long PUCCH multiplexed by TDM in one slot may be supported, and two short PUCCCHs multiplexed by TDM in one slot may be supported.

(Default QCL for Single DCI-Based Multi-TRPs)

For single DCI-based multi-TRP/panel transmission using at least one TCI state having QCL type D configured for the serving cell of the scheduled PDSCH, if a time offset between reception of a PDCCH and its corresponding PDSCH is smaller than a threshold (timeDurationForQCL) after reception of an activation command of the TCI state for a UE-specific PDSCH, the UE may assume that the DMRS port of the PDSCH follows the QCL parameter indicated by the next default TCI state. The UE may use the TCI state corresponding to the lowest code point out of the TCI code points including two different TCI states activated for the PDSCH as the default TCI state. If all of the TCI code points are mapped to a single TCI state, the default TCI state may follow operation of Rel. 15. Using the default TCI state for a plurality of PDSCHs based on the single DCI may be a part of the UE capability.

For the single DCI-based multi-TRP/panel transmission, if the time offset between reception of a PDCCH and its corresponding PDSCH is equal to or larger than the threshold, the UE may assume that the DMRS port of the PDSCH follows one or two TCI states corresponding to the TCI code point indicated by the TCI field in the PDCCH.

For multi-DCI-based multi-TRP/panel transmission, when the CORESET pool index (CORESETPoolIndex) is configured, if a time offset between reception of a PDCCH and its corresponding PDSCH is smaller than a threshold, the UE may assume that the DM-RS port of the PDSCH is quasi-co-located with the RS related to the QCL parameter used for the PDCCH of the lowest CORESET index out of the CORESETs configured with the same value of the CORESET pool index in each of the latest slots in which one or more CORESETs associated with respective CORESET pool indices in the active BWP of the serving cell are monitored by the UE. Support of this function may be indicated (reported) by the UE capability. If the UE does not support this function, operation of Rel. 15 may be reused regardless of the CORESET pool indices.

FIGS. 9A and 9B are each a diagram to show an example of default QCL of multi-PDSCHs based on the single DCI. The example shown in FIGS. 9A and 9B corresponds to the example of the single PDCCH shown in FIG. 3B.

The UE receives DCI 1 and PDSCH 1 transmitted from panel 1 (or TRP 1 or CORESET pool 1). The UE receives PDSCH 2 transmitted from panel 2 (or TRP 2 or CORESET pool 2).

DCI 1 schedules reception of PDSCH 1 and PDSCH 2. Scheduling offset 1 from reception of the DCI 1 to PDSCH 1 is smaller than a scheduling offset threshold. Scheduling offset 2 from reception of the DCI 1 to PDSCH 2 is smaller than the scheduling offset threshold.

FIG. 9B shows an example of correspondence between the TCI code point and the TCI state of the TCI field of DCI 1 assumed in the example of FIG. 9A. In the present example, the lowest code point out of the TCI code points including two different TCI states activated for the PDSCH is "001." The UE may use the TCI state (TCI state ID) of T0 and T1 corresponding to the TCI code point "001" as the default QCL of PDSCH 1 and PDSCH 2.

(Default QCL for Multi-TRPs when TCI Code Point Indicates Two TCI States)

For multi-TRP/panel transmission using at least one TCI state having QCL type D configured for the serving cell of the scheduled PDSCH, when a time offset between reception of DL DCI and a PDSCH corresponding to the DL DCI is smaller than a threshold (timeDurationForQCL), and at least one TCI code point indicates two TCI states, the UE may assume that the DMRS port of the PDSCH is quasi-co-located with the RS related to the QCL parameter related to the TCI state corresponding to the lowest code point out of the TCI code points including two different TCI states.

For the multi-TRP/panel transmission, when the time offset between reception of DL DCI and a PDSCH corresponding to the DL DCI is equal to or larger than the threshold (timeDurationForQCL), the UE may assume that the DMRS port of the PDSCH is quasi-co-located with the RS in the TCI state related to a QCL type parameter given by an indicated TCI state in the DL DCI.

Here, the threshold may be limited based on a UE capability information report.

When the UE is configured with the PDSCH of a single slot, the indicated TCI state may be based on an active TCI state in the slot of the scheduled PDSCH.

When the PDSCH of a plurality of slots (multi-slot) is configured, the indicated TCI state may be based on an active TCI state in the first slot of the scheduled PDSCH, and the UE may expect that the same active TCI state is applied across slots of the scheduled PDSCH.

Incidentally, in NR of Rel. 16 or later versions, support of at a maximum of two or more TCI states for one TCI code point is under study. However, a configuration method of the TCI states in such a case has not yet been fully studied. Unless the study is fully conducted, increase of communication throughput is suppressed.

Indication of the TCI state for the PDSCH using the MAC CE is under study. However, a control method of the TCI state for suppressing overhead with the MAC CE indication method is desirable.

In view of this, the inventors of the present invention came up with the idea of a method of appropriately determining the TCI state for a plurality of PDSCH reception occasions using the multi-TRPs.

Embodiments according to the present disclosure will be described in detail below with reference to the drawings. The radio communication methods according to respective embodiments may each be employed individually, or may be employed in combination.

In the present disclosure, a panel, an Uplink (UL) transmission entity, a TRP, spatial relation, a control resource set (CORESET), a PDSCH, a codeword, a base station, an antenna port (for example, a demodulation reference signal (DMRS) port) of a certain signal, an antenna port group (for example, a DMRS port group) of a certain signal, a group (for example, a code division multiplexing (CDM) group, a reference signal group, a CORESET group) for multiplexing, a CORESET pool, a CW, a redundancy version (RV), and a layer (a MIMO layer, a transmission layer, a spatial layer) may be interchangeably interpreted. A panel Identifier (ID) and a panel may be interchangeably interpreted. In the present disclosure, a TRP ID and a TRP may be interchangeably interpreted.

In the present disclosure, NCJT, NCJT using multi-TRPs, multi-PDSCHs using NCJT, multi-PDSCHs, a plurality of PDSCHs from multi-TRPs, and the like may be interchangeably interpreted. Note that the multi-PDSCHs may mean a plurality of PDSCHs multiplexed with at least one of SDM, FDM, and TDM, may mean a plurality of PDSCHs carrying the same TB or the same CW, or may mean a plurality of PDSCHs to which different UE receive beams (spatial domain reception filters, QCL parameters, TCI states) are applied.

In the present disclosure, a default TCI state may be interchangeably interpreted as default QCL, default QCL assumption, default spatial relation, a default unified TCI state, and the like. In the following, the TCI state or the QCL (QCL assumption) is referred to as a default TCI state; however, the term is not limited to this.

Note that definition of the default TCI state is not limited to this. The default TCI state may be, for example, regarding a certain channel/signal (for example, PDSCH), a TCI state assumed when the TCI state/QCL specified by the DCI is not available, or may be a TCI state assumed when the TCI state/QCL is not specified (or configured).

In the present disclosure, a cell, a CC, a carrier, a BWP, and a band may be interchangeably interpreted.

In the present disclosure, an index, an ID, an indicator, and a resource ID may be interchangeably interpreted.

A TCI state, a TCI state or QCL assumption, QCL assumption, a QCL parameter, a spatial domain reception filter, a UE spatial domain reception filter, a spatial domain filter, a UE receive beam, a DL receive beam, DL precoding, a DL precoder, a DL-RS, a QCL parameter followed by a DMRS port, an RS of QCL type D of a TCI state or QCL assumption, and an RS of QCL type A of a TCI state or QCL assumption may be interchangeably interpreted. An RS of QCL type D, a DL-RS associated with QCL type D, a DL-RS having QCL type D, a source of a DL-RS, an SSB, and a CSI-RS may be interchangeably interpreted.

In the present disclosure, the TCI state may be information (for example, a DL-RS, a QCL type, a cell in which the DL-RS is transmitted, or the like) related to a receive beam (spatial domain reception filter) indicated (configured) for the UE. The QCL assumption may be information (for example, a DL-RS, a QCL type, a cell in which the DL-RS is transmitted, or the like) related to a receive beam (spatial domain reception filter) assumed by the UE, based on transmission or reception of an associated signal (for example, a PRACH).

In the present disclosure, the latest slot, the most recent slot, the latest search space, and the most recent search space may be interchangeably interpreted.

(Radio Communication Method)

In one or more embodiments of the present disclosure, the UE may satisfy at least one of the following conditions 1 to 5 (in other words, when at least one of the following conditions 1 to 5 is satisfied, the UE may operate based on at least one of the embodiments described below):

[Condition 1] When a scheduling offset of the DCI for the PDSCH is less than a certain threshold (for example, timeDurationForQCL),

[Condition 2] When the TCI field presence information (tci-PresentInDCI) is not configured for the UE,

[Condition 3] When the multi-TRPs are configured for URLLC,

[Condition 4] When information for enabling switching of the default TCI state in Rel. 16 (in other words, operation based on at least one of the embodiments described below) is configured by new higher layer signaling (for example, RRC signaling), and

[Condition 5] When the UE capability information (UE capability) indicating that the default TCI state can be switched is reported to the network.

Condition 3 above may be a case in which, for example, a specific higher layer parameter (for example, PDSCH-Config) is configured for the UE. The specific higher layer parameter (for example, PDSCH-Config) may be at least one entry of pdsch-TimeDomainAllocationList including RepNumR16 in a PDSCH-TimeDomainResourceAllocation element [condition 3-1].

Condition 3 above may be a case in which, for example, a plurality of (for example, two) TCI states are configured for the UE by another DCI field (for example, "time domain resource allocation") as well as a specific DCI field (for example, "transmission configuration indication"), and one or more DMRS ports in one CDM group in a DCI field "antenna port" are configured. Such another DCI field (for example, "time domain resource allocation") may be at least one entry of pdsch-TimeDomainAllocationList including RepNumR16 in the PDSCH-TimeDomainResourceAllocation element [condition 3-2].

Conditions 3-1 and 3-2 above may be applied individually or applied in combination to the UE.

First Embodiment

In the present embodiment, the UE may perform control of transmission and reception by using a scheme of the default TCI state in Rel. 16.

Note that the present embodiment describes an example of a case in which the number of PDSCH reception occasions (PDSCH repetition) is 4 or 2; however, the number of PDSCH reception occasions (PDSCH repetition) is not limited to this. The ordering of application of the TCI state to the PDSCH reception occasion is not limited to the example shown in the figure.

In the present disclosure, the UE may cyclically apply a plurality of TCI states to the PDSCH reception occasions (this method may be referred to as a first method or a cyclic method (cyclic manner)). For example, when R TCI states are configured, the first to R-th TCI states may be respectively applied to the first to R-th PDSCH reception occasions. When the number (R) of TCI states is smaller than the number of reception occasions, the same TCI state (first to R-th again) may be cyclically applied to the rest of the PDSCH reception occasions.

In the present disclosure, the UE may sequentially apply a plurality of TCI states to the PDSCH reception occasions (this method may be referred to as a second method or a sequential method (sequential manner)). For example, when R TCI states are configured for K PDSCH reception occasions, the r (r=1, . . . , R−1)-th TCI state may be applied to the [(r−1) K/R+1]-th to (rK/R)-th PDSCH reception occasions, and the R-th TCI state may be applied to the [(R−1) K/R+1]-th to K-th PDSCH reception occasions.

Embodiment 1.1

The number of TCI states for each DCI code point of the DCI format (for example, DCI format 1_1) may be common to the number of TCI states that may be applied in Rel. 16. In other words, for the number of TCI states for each DCI code point of the DCI format (for example, DCI format 1_1), the number of TCI states common to the number of TCI states that may be applied in Rel. 16 may be configured, and the UE may control transmission and reception.

In this case, the number of bits of the DCI field related to the TCI state may be 3 bits. One or two TCI states may correspond to one DCI code point. A maximum of eight TCI states may be activated.

In this case, the UE may generate (determine) a set of other TCI states to be applied to the PDSCH reception occasions from other DCI code points different from the default TCI states and the TCI states indicated from the network.

Other DCI code points may be the DCI code points of two active TCI states being the m-th (m is an integer of 2 or greater) smallest (lowest). Alternatively, other DCI code points may be the DCI code point of one active TCI state being the m-th smallest and the DCI code point of one active TCI state being the (m+1)-th smallest.

Note that, in the present embodiment, the maximum number of default TCI states corresponding to one DCI code point may be reported to the UE by higher layer signaling (for example, RRC signaling), may be determined based on the UE capability information, or may be determined based on the number of actual PDSCH reception occasions (PDSCH repetition).

Figure 10:
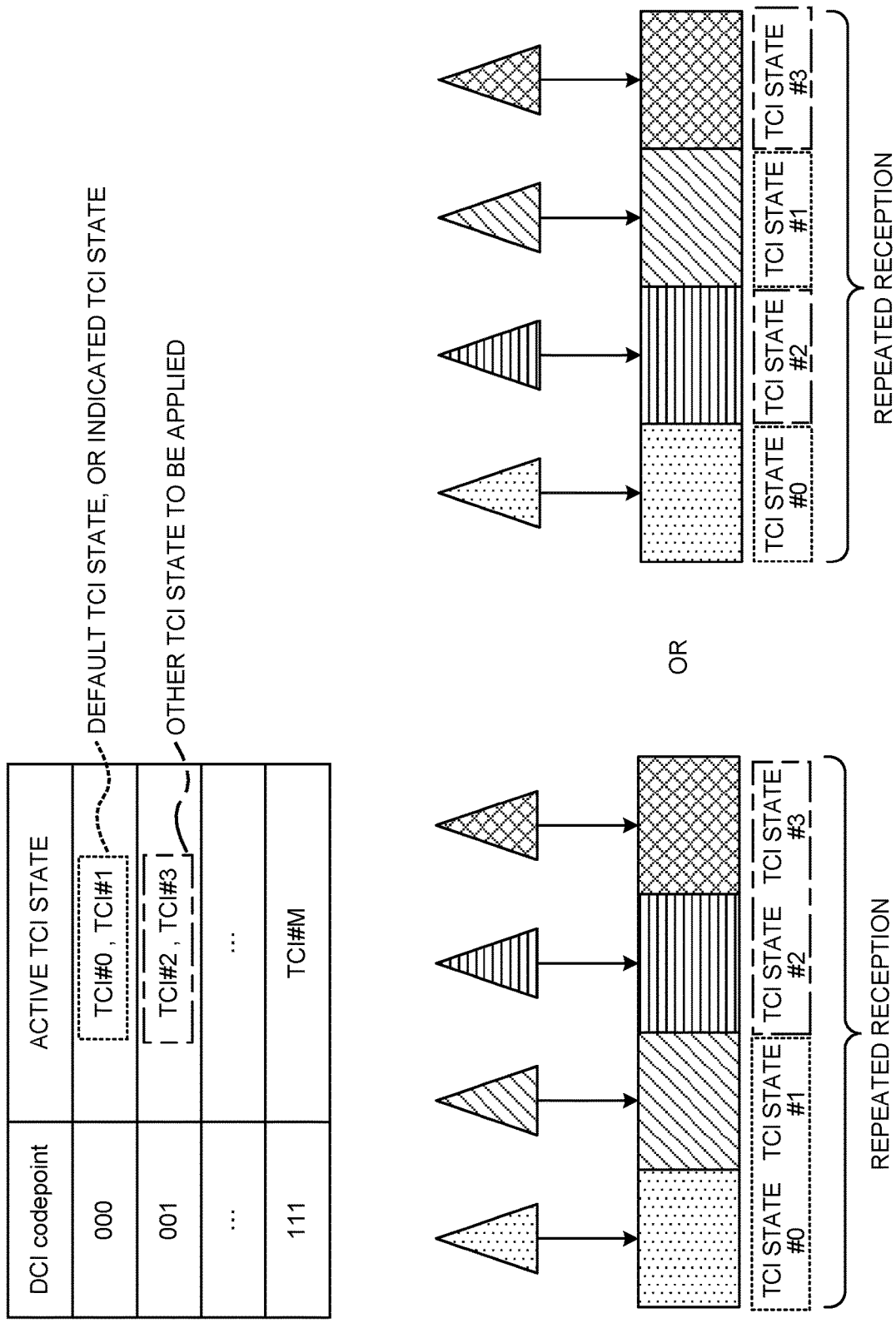
FIG. 10 is a diagram to show an example of TCI states to be applied to PDSCH reception occasions.

FIG. 10 is a diagram to show an example of the TCI states to be applied to the PDSCH reception occasions. In the example shown in FIG. 10, the DCI code point has 3 bits, and a maximum of two active TCI states are configured for each DCI code point. In FIG. 10, TCI #0 and TCI #1 corresponding to DCI code point 000 are the TCI states configured as the default TCI states or indicated from the NW. The UE may determine TCI #2 and TCI #3 corresponding to DCI code point 001 as the TCI states to be applied to the PDSCH reception occasions, other than the default TCI states. The UE applies TCI states #0 to #3 to the PDSCH reception occasions and controls reception of the PDSCH.

According to embodiment 1.1, communication control can be simplified, and overhead in DCI reception of the UE can be suppressed.

Embodiment 1.2

The number of TCI states for each DCI code point of the DCI format (for example, DCI format 1_1) may be equal to or larger than the number of TCI states that may be applied in Rel. 16. In other words, for the number of TCI states for each DCI code point of the DCI format (for example, DCI format 1_1), the number of TCI states common to the number of TCI states that may be applied in Rel. 16 may be configured, and the UE may control transmission and reception.

In this case, the number of bits of the DCI field related to the TCI state may be 3 bits or more. Two or more TCI states may correspond to one DCI code point. A maximum of eight or more TCI states may be activated.

When the default TCI states configured for the UE (or the TCI states indicated from the NW) are two TCI states, the UE may apply the two TCI states to the PDSCH reception occasions. Note that the "default TCI states configured for the UE" of the present disclosure may be interpreted as the default TCI states determined by the UE based on the TCI states and the like configured/activated by RRC/MAC.

Figure 11:
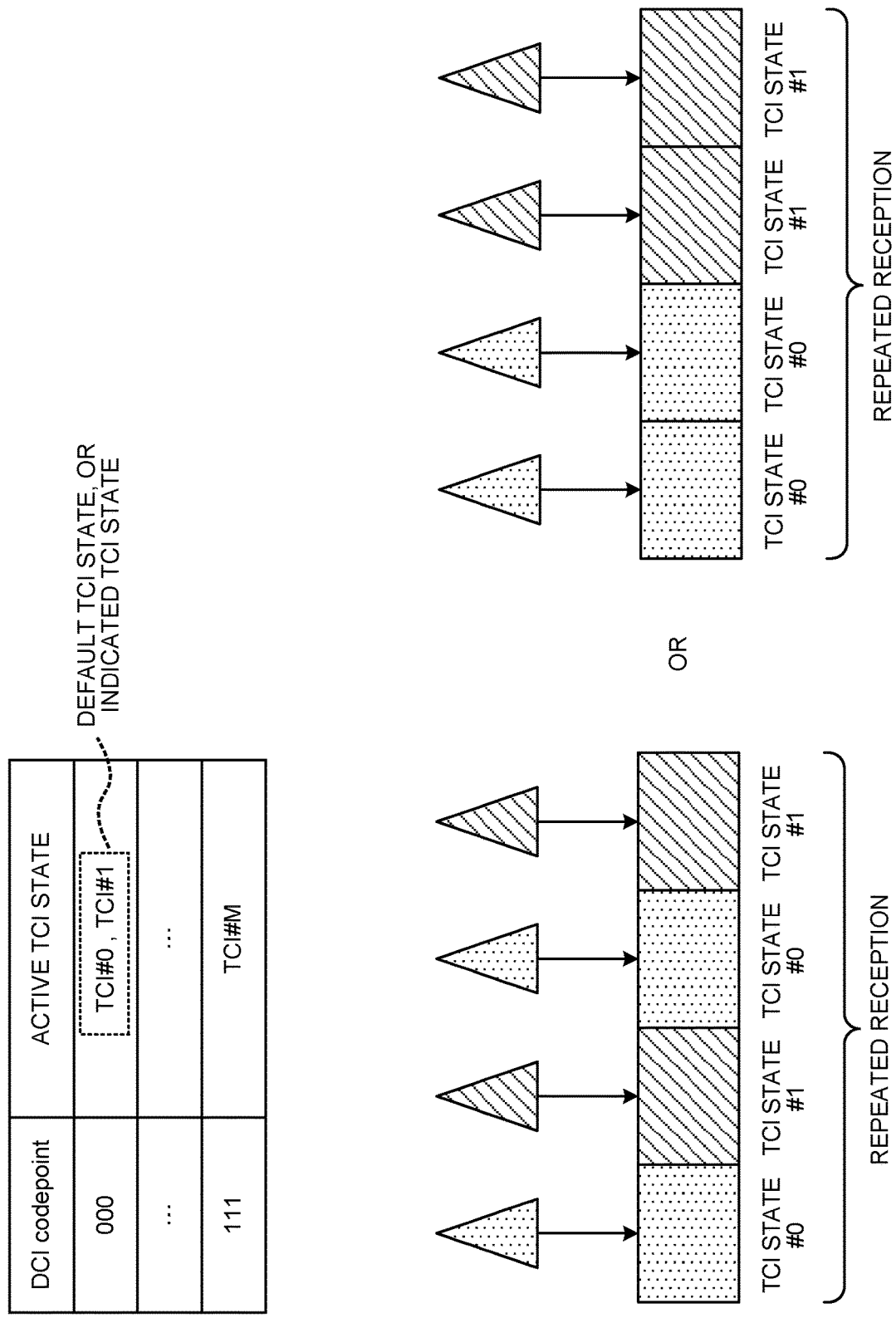
FIG. 11 is a diagram to show an example of TCI states to be applied to PDSCH reception occasions.

FIG. 11 is a diagram to show an example of the TCI states to be applied to the PDSCH reception occasions. In FIG. 11, TCI #0 and TCI #1 corresponding to DCI code point 000 are the TCI states configured as the default TCI states or indicated from the NW. In this case, the UE applies TCI states #0 and #1 to the PDSCH reception occasions, and controls reception of the PDSCH.

When the default TCI states configured for the UE (or the TCI states indicated from the NW) are two or more TCI states, the UE may apply the two or more TCI states to the PDSCH reception occasions.

Figure 12:
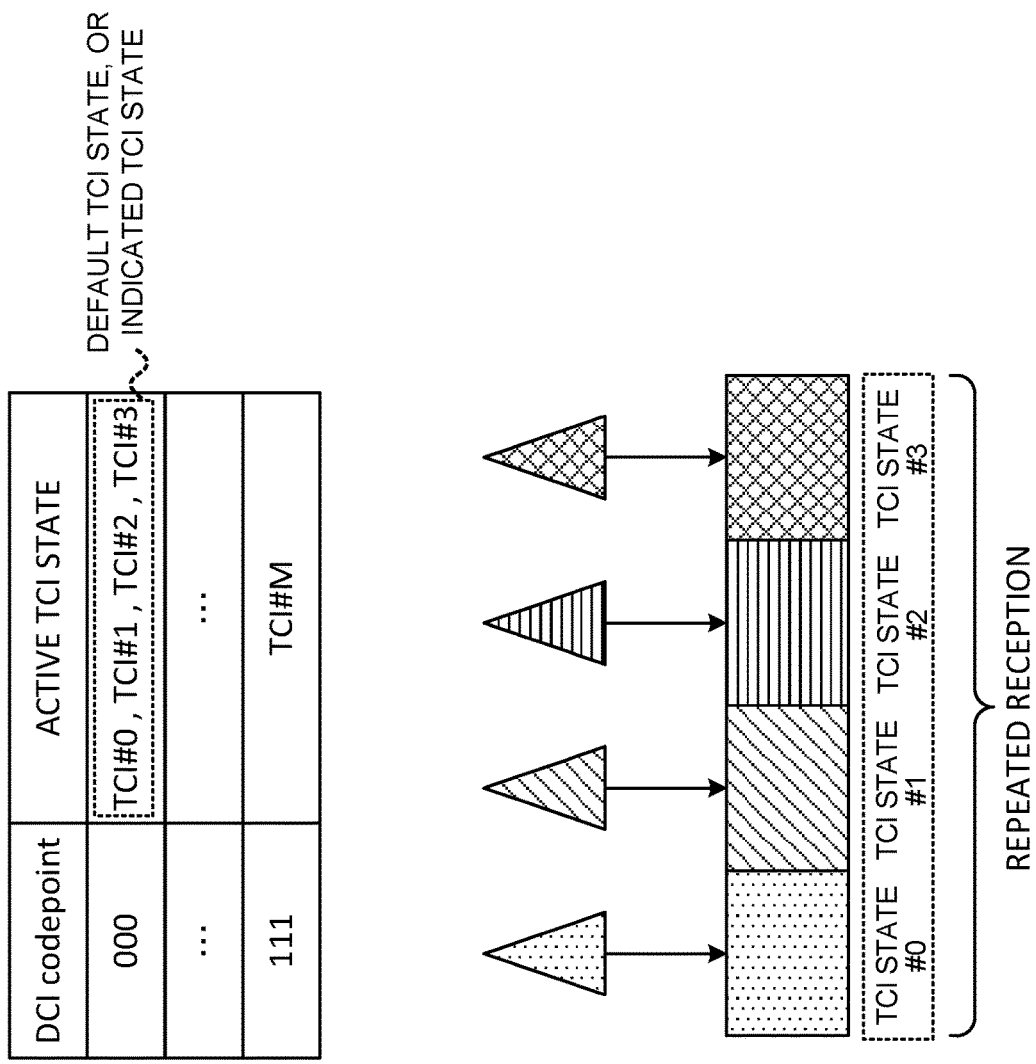
FIG. 12 is a diagram to show an example of TCI states to be applied to PDSCH reception occasions.

FIG. 12 is a diagram to show an example of the TCI states to be applied to the PDSCH reception occasions. In FIG. 12, TCIs #0 to #3 corresponding to DCI code point 000 are the TCI states configured as the default TCI states or indicated from the NW. In this case, the UE applies TCI states #0 to #3 to the PDSCH reception occasions and controls reception of the PDSCH.

When the maximum number of default TCI states configured for the UE (or TCI states indicated from the NW) is larger than the number of PDSCH reception occasions of the UE, the UE may select as many TCI state indices as the number of PDSCH reception occasions in ascending order (or descending order) out of the configured default TCI states (or the TCI states indicated from the NW), and apply the TCI states corresponding to the TCI state indices to the PDSCH reception occasions.

Figure 13:
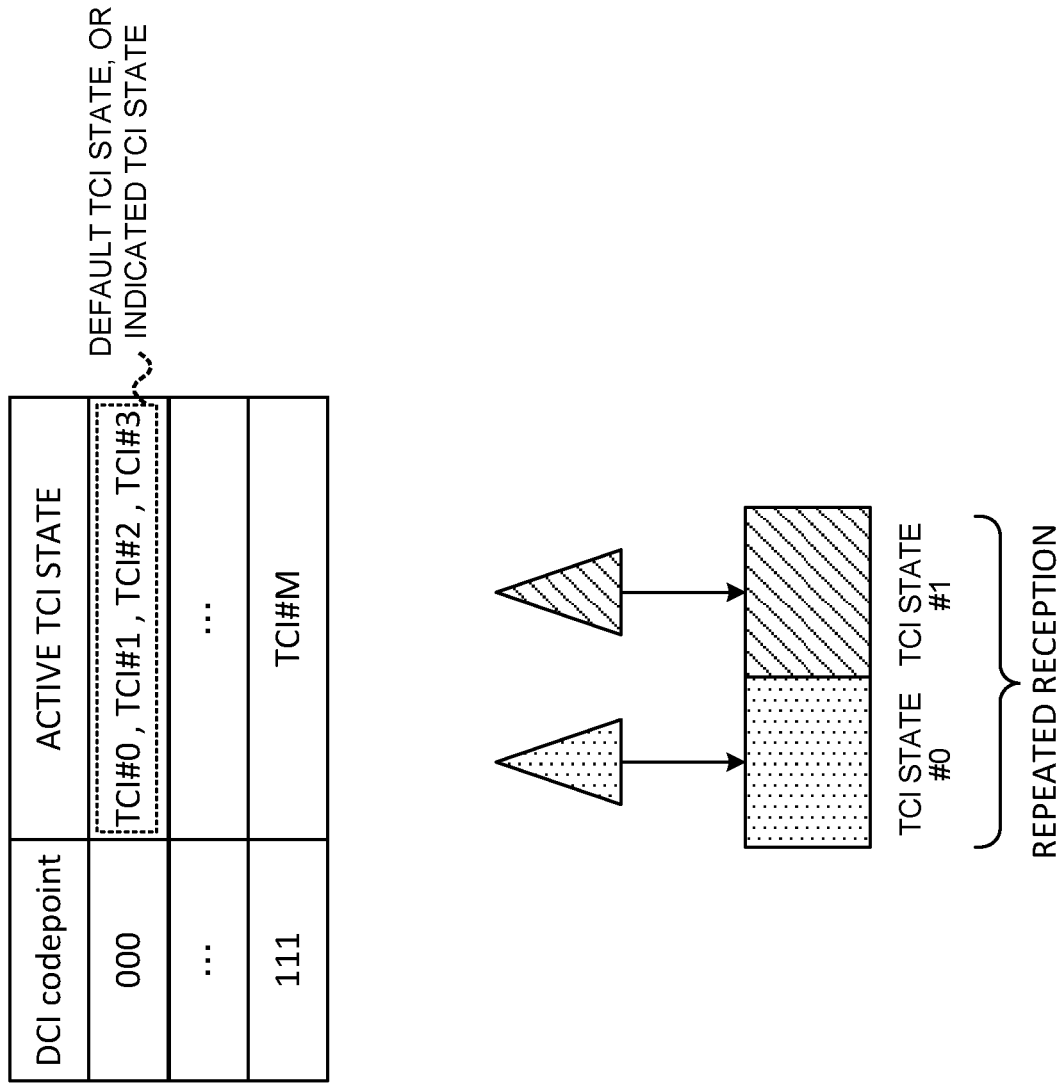
FIG. 13 is a diagram to show an example of TCI states to be applied to PDSCH reception occasions.

FIG. 13 is a diagram to show an example of the TCI states to be applied to the PDSCH reception occasions. In FIG. 13, TCIs #0 to #3 corresponding to DCI code point 000 are the TCI states configured as the default TCI states or indicated from the NW. When the number of PDSCH reception occasions of the UE is 2, the UE applies TCI states #0 and #1 out of TCI states #0 to #3 to the PDSCH reception occasions, and controls reception of the PDSCH.

When the maximum number of default TCI states configured for the UE (or TCI states indicated from the NW) is larger than the number of PDSCH reception occasions of the UE, the UE may assume that the TCI states corresponding to the DCI code points having the number of TCI states equal to or less than the number of PDSCH reception occasions are configured as the default TCI states (or the TCI states indicated from the NW). Next, the UE may apply the default TCI states (or the TCI states indicated from the NW) to the PDSCH reception occasions.

When the maximum number of default TCI states configured for the UE (or TCI states indicated from the NW) is larger than the number of PDSCH reception occasions of the UE, the UE may assume that the TCI states corresponding to the DCI code points having the number of TCI states the same as the number of PDSCH reception occasions are configured as the default TCI states (or the TCI states indicated from the NW). Next, the UE may apply the default TCI states (or the TCI states indicated from the NW) to the PDSCH reception occasions.

Figure 14:
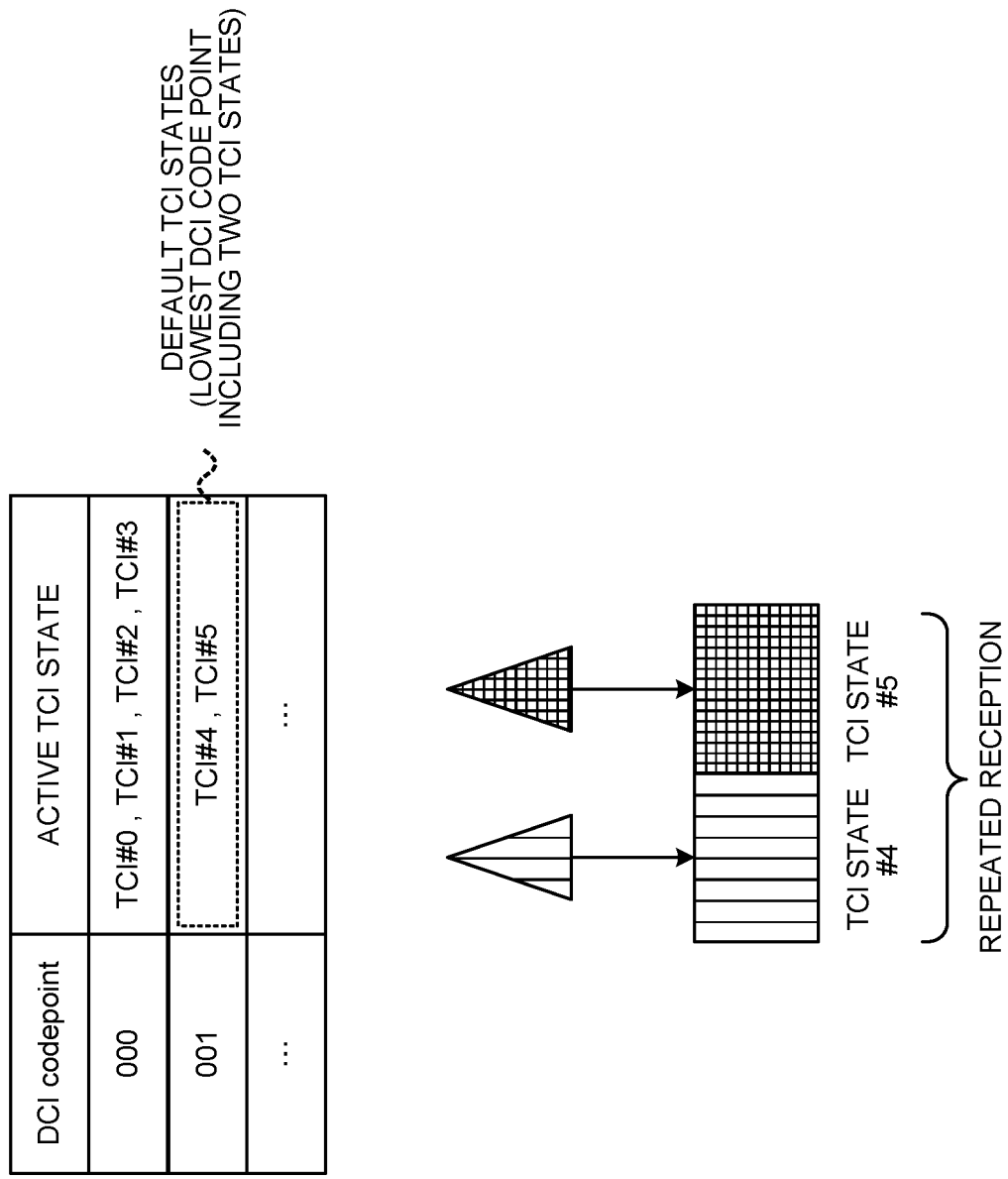
FIG. 14 is a diagram to show an example of TCI states to be applied to PDSCH reception occasions.

FIG. 14 is a diagram to show an example of the TCI states to be applied to the PDSCH reception occasions. In FIG. 14, when the number of PDSCH reception occasions of the UE is 2, TCIs #4 and #5 corresponding to DCI code point 001 are configured as the default TCI states. The UE applies TCI states #4 and #5 to the PDSCH reception occasions, and controls reception of the PDSCH.

According to embodiment 1.2, for example, the default TCI states configured for the UE can be appropriately applied to the PDSCH reception occasions, and more flexible PDSCH reception control can be performed.

Second Embodiment

A second embodiment relates to the default TCI state (QCL) for each reception occasion of the repeated reception. FIGS. 15A and 15B are each a diagram to show an example of the default TCI state of the repeated reception. FIGS. 15A and 15B correspond to four times of repeated DL reception. Note that, in the following drawings, different hatchings may mean different TCI states (beams) regarding the TRP, repeated reception/transmission, and the like. In the present embodiment, a new RRC parameter may be introduced in order to enable switching of operations from the mechanism of the default TCI state in Rel. 16.

In the present disclosure, the TCI state may or may not be explicitly reported to the UE by higher layer signaling (for example, RRC signaling/MAC CE). The QCL assumption may or may not be explicitly configured for the UE. The UE may assume that the PDSCH is quasi-co-located with the SSB identified in the most recent PRACH transmission.

The default TCI state may be the same (or common) in each reception occasion (embodiment 2.1). In this case, for example, the same QCL can be applied to the DMRS across a plurality of slots, and thus more satisfactory channel estimation accuracy in the UE can be secured. FIG. 15A shows an example in which the UE performs repeated reception of each reception occasion in accordance with the same TCI state #0.

The UE may assume that the same one default TCI state is selected by any one of the followings:

Same rule as that in Rel. 15 (embodiment 2.1.1), and
TCI state/QCL of scheduling DCI (embodiment 2.1.2).

According to embodiment 2.1.1, the default TCI state can be determined similarly to the conventional rule, which thus facilitates implementation of the UE.

In embodiment 2.1.2, the default TCI state may be a TCI state corresponding to the TCI state of the CORESET in which the scheduling DCI is detected.

According to embodiment 2.1.2, PDSCH reception can be performed based on a successfully received beam, and thus success of DL reception can be expected.

The default TCI state may be different in each reception occasion (embodiment 2.2). In this case, for example, by using the multi-TRPs, more satisfactory robustness (spatial diversity) for suppression of blockage can be secured. FIG. 15B shows an example in which the UE performs repeated reception of the first to fourth reception occasions in accordance with different TCI states #0 to #3, respectively. In this case, the TCI state for each reception occasion may be applied with each method described in the first embodiment.

The UE may assume that a plurality of default TCIs for a plurality of reception occasions are derived by any one of the followings:

TCI state ID/QCL ID of each CORESET (embodiment 2.2.1),
Ordering of TCI state IDs/QCL IDs indicated (which may be interchangeably interpreted as configured, activated, or the like) by RRC/MAC CE (embodiment 2.2.2),
Predetermined TCI state/QCL for at least one reception occasion, and configured/activated TCI state/QCL for the rest of the reception occasions (embodiment 2.2.3),
Ordering of beam IDs indicated by RRC/MAC CE (embodiment 2.2.4), and
Ordering of CORESETs determined in advance, or indicated by RRC/MAC CE (embodiment 2.2.5).

In embodiment 2.2.1, the plurality of default TCI states may include TCI states corresponding to all of the configured CORESETs. For example, the UE configured with CORESETs #0 to #2 may respectively receive in accordance with the TCI state of CORESET #0, the TCI state of CORESET #1, the TCI state of CORESET #2, and the TCI state of CORESET #0, in the first to fourth reception occasions of FIG. 15B.

According to embodiment 2.2.1, the UE can determine the default TCI states for the multi-TRPs even if there is no additional/specific signaling in comparison to Rel. 15, and thus increase of the amount of communication required for reporting of the default TCI states can be suppressed.

In embodiment 2.2.2, the plurality of default TCI states may correspond to ordering of configured/activated certain TCI state IDs. The ordering may be specified by a list including a plurality of sets of an index (which may be referred to as an ordering index) indicating ordering of reception occasions the CI state corresponds to, and a TCI state ID corresponding to the index. Note that the index may be implicitly included in the list. The index may start from 0.

Note that the ordering of the TCI state IDs may be referred to as a list/set/group/sequence of TCI state IDs (or TCI states) or the like.

Figure 16:
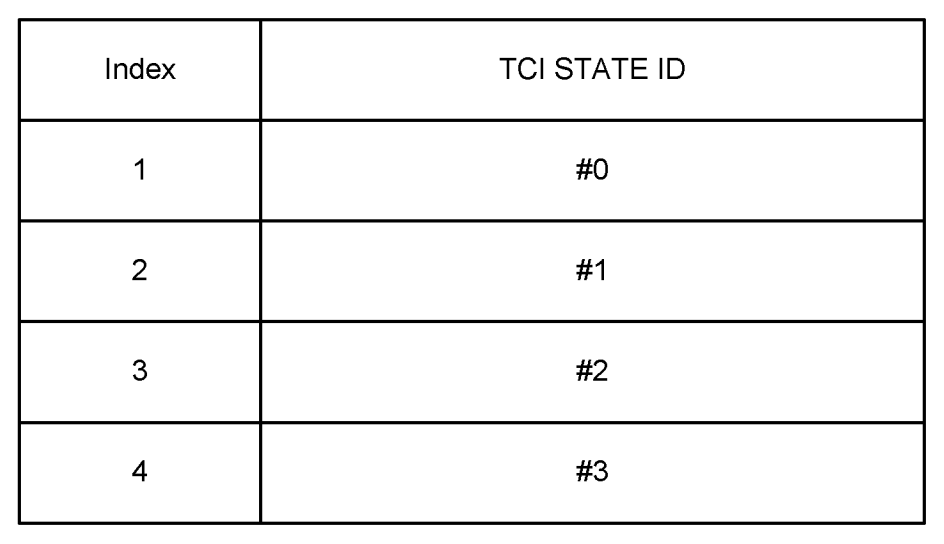

FIG. 16 is a diagram to show an example of ordering of the TCI state IDs according to embodiment 2.2.2. In the present example, TCI state IDs #0 to #3 are respectively associated with indices 1 to 4. In this case, the UE may respectively receive in accordance with TCI state IDs #0 to #3 in the first to fourth reception occasions of FIG. 15B.

According to embodiment 2.2.2, the UE can easily determine the default TCI states for the multi-TRPs.

In embodiment 2.2.3, the UE may determine the default TCI state of at least one reception occasion out of the plurality of default TCI states, based on determination of one default TCI state shown in embodiment 2.1, for example (embodiments 2.1.1 to 2.1.3). The UE may determine the default TCI states of the rest of the reception occasions, based on determination of the plurality of default TCI states shown in embodiment 2.2.1 or 2.2.2, for example.

Note that the at least one reception occasion for which determination of the default TCI state shown in embodiment 2.1 is used may be the initial (in other words, the first) reception occasion of repetition, or may be another specific (for example, the last) reception occasion.

FIGS. 17A and 17B are each a diagram to show an example of the default TCI states according to embodiment 2.2.3. In the present example, it is assumed that the number of times of repeated reception is 4.

FIG. 17A shows an example in which the default TCI state of the first reception occasion is determined based on embodiment 2.1.1, and the default TCI states of the second to fourth reception occasions are determined based on embodiment 2.2.2. The default TCI state of the first reception occasion is a predetermined TCI state (for example, of a minimum CORESET ID).

FIG. 17B shows an example in which the default TCI state of the first reception occasion is determined based on embodiment 2.1.2, and the default TCI states of the second to fourth reception occasions are determined based on embodiment 2.2.2. The default TCI state of the first reception occasion is a TCI state implicitly reported by the TCI state of the scheduling DCI (for example, DCI format 1_1) of repeated reception.

According to embodiment 2.2.3, for example, a behavior common to that for the default TCI state of a single slot (without repetition) can be carried out for the default TCI state of the first slot of repeated reception of multi-slots, and complexity of control of the UE can be suppressed.

In embodiment 2.2.4, the plurality of default TCI states may correspond to ordering of configured/activated certain beam IDs. The ordering may be specified by a list including a plurality of sets of an index (which may be referred to as an ordering index) indicating ordering of the beam and a beam ID corresponding to the index. Note that the index may be implicitly included in the list. The index may start from 0.

Note that the ordering of the beam IDs may be referred to as a list/set/group/sequence of beam IDs (or beams) or the like.

The default TCI state of the first reception occasion of repeated reception may be a beam ID corresponding to a start position (start index), or may be a beam ID corresponding to a start ID.

The default TCI state of the i-th reception occasion of repeated reception may be a beam ID corresponding to an index of mod({start index+i−2}, number of times of repeated reception)+1, or may be a beam ID corresponding to an index of mod({(index being set with start ID)+i−2}, number of times of repeated reception)+1. Note that mod(X, Y) indicates a remainder obtained by dividing X by Y (modulo operation).

In embodiment 2.2.4 above, the UE may determine the start ID or the start position, based on at least one of the following, for example:

TCI state of scheduling DCI,
Default TCI state/default QCL assumption,
Explicit indication by RRC/MAC/DCI (for example, reporting of information related to the start ID),
TCI state of configured/activated PL-RS, and
Start time position (for example, a start slot, a start subslot, a start frame, a start subframe, a start symbol) of reception.

In embodiment 1.2.4 above, the UE may assume that the start ID is a specific beam ID (for example, a minimum beam ID; in a case of FIG. 18A to be described later, beam ID #1) out of configured/activated/predetermined beam ordering.

In embodiment 2.2.4 above, the UE may assume that the start position (start index) is a specific index (for example, a minimum index; in a case of FIG. 18A to be described later, ordering index 1) related to configured/activated/predetermined beam ordering.

Figures 18A, 18B:
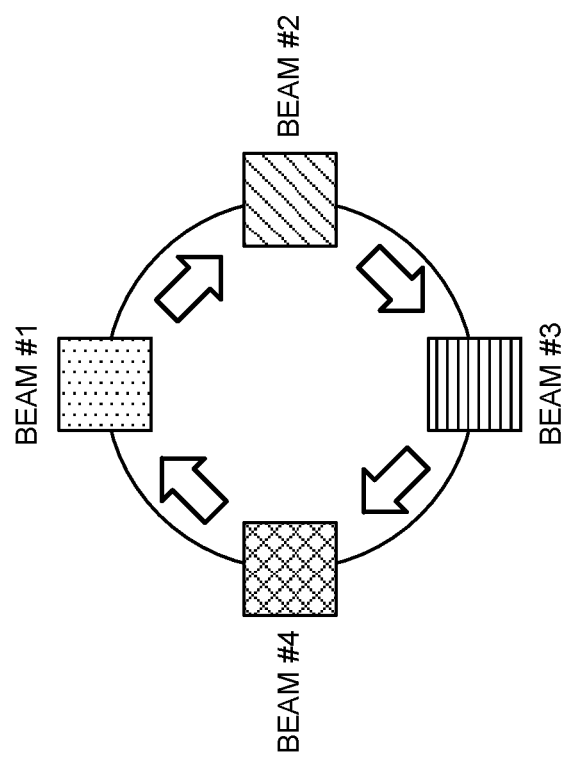
FIG. 18A and FIG. 18B are each a diagram to show an example of ordering of beam IDs according to embodiment 2.2.4.

FIGS. 18A and 18B are each a diagram to show an example of ordering of the beam IDs according to embodiment 2.2.4. As shown in FIG. 18A, in the present example, beam IDs #1 to #4 are respectively associated with indices 1 to 4. For example, when it is determined that the start ID is beam ID #1, the UE may respectively receive in accordance with beam IDs #1 to #4 in the first to fourth reception occasions of FIG. 15B.

FIG. 18B is a diagram showing transition of the ordering of the beam IDs of FIG. 18A. In other words, when the index of a certain reception occasion is 4, the index of the following reception occasion is 1.

According to embodiment 2.2.4, the UE can easily determine the default TCI states for the multi-TRPs. The UE can flexibly control use of the best beam for the first reception occasion.

In embodiment 2.2.5 above, details in which the beam ordering of embodiment 2.2.4 above is replaced by CORESET (or CORESET ID) ordering may be used. For example, the start ID (start position) of the CORESET may be determined based on a parameter similar to that in the description regarding the start ID of embodiment 2.2.4 above.

Note that the network may configure one of the three best TCI states for each CORESET. In this case, assuming that the CORESET ordering includes three CORESETs, the UE can determine the TCI state to be applied in accordance with the three best TCI states above.

Figure 19:
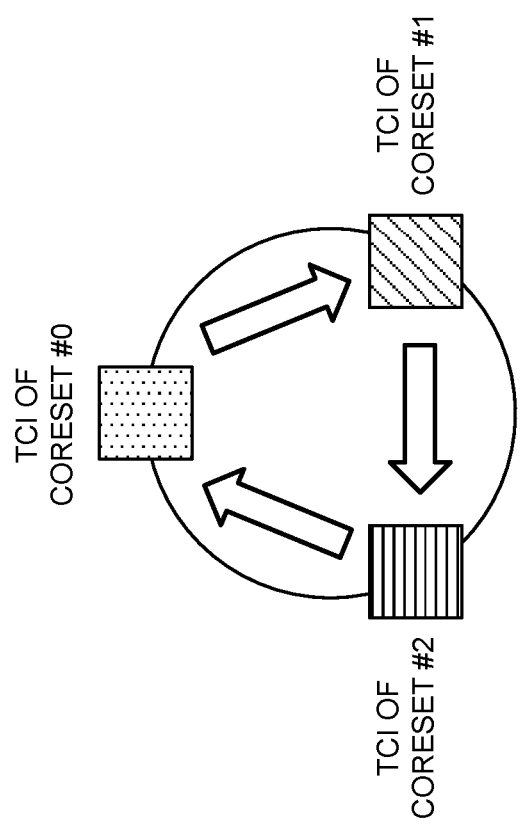
FIG. 19 is a diagram to show an example of ordering of CORESETs according to embodiment 2.2.5.

FIG. 19 is a diagram to show an example of ordering of the CORESETs according to embodiment 2.2.5. In the present example, it is assumed that the CORESET ordering is predetermined as the ordering of CORESETs #0, #1, and #2. When the default TCI state of a certain reception occasion follows the TCI of CORESET #2, the default TCI state of the following reception occasion may be in accordance with the TCI state of CORESET #0.

According to embodiment 2.2.5, the UE can easily determine the default TCI states for the multi-TRPs. When the CORESET ordering is defined in advance, additional signaling related to the CORESET ordering is not necessary.

Variations of Embodiment 2.2

In embodiments 2.2.1 to 2.2.5 described above, when the number of the plurality of derived default TCI states is the same as the number of times of repeated reception (number of DL reception occasions), mapping may be performed in a one-to-one manner; otherwise, mapping need not be performed in a one-to-one manner.

When the number of the plurality of derived default TCI states (beams) is larger than the number of times of repeated reception (number of DL reception occasions), first N (N is the number of times of repetition) IDs from the one having the largest (or smallest) IDs (CORESET IDs, TCI state IDs, spatial relation IDs, beam IDs, or the like) corresponding to the default TCI states may be applied to the respective repeated reception occasions. For example, in a case of embodiment 2.2.1, when the number (for example, 3) of CORESETs is larger than the number (for example, 2) of times of repetition, the TCI states of two CORESET IDs (for example, CORESETs #0 and #1) may be respectively applied to the first to second reception occasions.

Note that "from the one having the largest (or smallest)" herein may be interpreted as "from the start index (or the start ID)" or the like in embodiments 2.2.4 and 2.2.5, for example.

When the number of the plurality of derived default TCI states (beams) is smaller than the number of times of repeated reception (number of DL reception occasions), the IDs (CORESET IDs, TCI state IDs, spatial relation IDs, beam IDs, or the like) corresponding to the default TCI states may be applied to the respective repeated reception occasions, based on at least one of the first method (for example, the cyclic method (cyclic manner)) and the second method (for example, the sequential method (sequential manner)).

For example, in a case of embodiment 2.2.1, when the number (for example, 2) of CORESETs is smaller than the number (for example, 4) of times of repetition, the TCI states of two CORESET IDs (for example, CORESETs #0 and #1) may be respectively applied to the first to fourth reception occasions.

In a case of the cyclic method, for example, the TCI of CORESET #0, the TCI of CORESET #1, the TCI of CORESET #0, and the TCI of CORESET #1 may be respectively used for the first, second, third, and fourth reception occasions. In a case of the sequential method, for example, the TCI of CORESET #0, the TCI of CORESET #0, the TCI of CORESET #1, and the TCI of CORESET #1 may be respectively used for the first, second, third, and fourth reception occasions.

According to the second embodiment described above, the UE can appropriately determine the default TCI states for repeated reception.

Third Embodiment

The third embodiment will describe a case in which whether or not to apply the second embodiment and other embodiments is based on the UE capability.

When at least one of the following UE capabilities is reported, at least one of the second embodiment and other embodiments may be applied:
  Whether or not different TCIs/QCLs can be applied regarding each reception occasion,
  Whether or not different TCI states can be applied regarding the default TCI state/QCL of each reception occasion,
  Number of supported TCI states/QCLs,
  Number of supported CORESETs, and
  Number of beam switches (number of times of beam switching) between all of the reception occasions regarding repetition of the same data.

When information related to some number is reported as the UE capability and the number is equal to or larger than (or equal to or lower than) a certain value, at least one of the second embodiment and other embodiments may be applied.

According to the third embodiment described above, determination related to the TCI states of repeated reception can be appropriately controlled based on the UE capability.

Fourth Embodiment

The UE may determine (select) the N TCI states from the TCI states of each reception occasion (slot, subslot, or the like) of the repetition PDSCH, based on measurement results (for example, L1-SINR/L1-RSRP) of a beam report.

Specifically, N TCI states applied to repeated reception may correspond to N best beams measured by the UE. For example, the UE may measure a reference signal received using a large number of beams, and may report a beam report regarding beams having measurement results such as L1-SINR/L1-RSRP in high ranks to the network. Based on the report (for example, the latest reported TCI states (beams)), the base station may indicate for the UE to include N best TCI states as the TCI states for reception of the PDSCH scheduled for the UE.

As compared to a case in which the UE uses a larger number of beams than N beams having measurement results from the highest rank for repeated reception, when the UE uses N beams having measurement results from the highest rank for repeated reception, enhancement of communication characteristics is expected.

Note that, if one best beam at timing of repeated reception is known, performing repeated reception using only the beam is desirable from the viewpoint of communication characteristics. However, in actuality, there are blockage including random elements, environmental changes, and the like, which make it difficult to know the best instantaneous beam at the time point of communication. Thus, if diversity transmission/reception is performed using N best beams, enhancement of reliability of communication can be expected. Note that, from the viewpoint of diversity, it is assumed that N suffices to be at most 2 or 4 (because it is considered unlikely that all of the 2 or 4 beams are simultaneously subjected to blockage). N above may be predetermined in a specification, may be configured for the UE by higher layer signaling/MAC signaling, or may be the same value as the number of reported beams included in a beam report.

According to the fourth embodiment described above, the UE can appropriately determine the default TCI states for repeated reception.

<Additional Notes>

Each of the embodiments described above may be independently used for each channel/signal, or may be used to be common to a plurality of channels/signals. For example, the default TCI states of the PDSCH may be determined with methods different from each other, or may be determined with a common method.

For example, the higher layer signaling (for example, RRC signaling for configuration of the beam ordering) used in the present disclosure may be independently configured for each channel/signal, or may be collectively configured regarding a plurality of channels/signals with one parameter (in this case, the one parameter is applied to the plurality of channels/signals).

For example, the higher layer signaling regarding the PDSCH (the beam ordering regarding the PDSCH or the like) may be configured using at least one of the followings:
  Parameter included in PDSCH configuration information (PDSCH-Config information element),
  Parameter related to the TCI state of the PUSCH,
  Parameter related to resource reporting of the PDSCH (a PDSCH resource, a time domain resource allocation list (PDSCH-TimeDomainResourceAllocationList information element), a part of a field for reporting the number of PUSCH repetitions indicated by a higher layer parameter or DCI (which may be referred to as, for example, a PDSCH repetition number field or the like), or a part of a frequency domain resource allocation field indicated by a higher layer parameter or DCI), and
  Parameter related to resource reporting of the PUCCH (a PUCCH resource (PUCCH-Resource information element), a PUCCH resource set (PUCCH-ResourceSet information element), a part of a field for reporting the number of PUCCH repetitions indicated by a higher layer parameter or DCI (which may be referred to as, for example, a PUCCH repetition number field or the like), a part of a PUCCH resource indicator field included in DCI, or a part of PUCCH resources indicated by the PUCCH resource indicator field included in DCI).

The higher layer signaling regarding a plurality of channels/signals may be configured for each UL BWP (for example, included in a BWP-Uplink information element), may be configured for each DL BWP (for example, included in a BWP-Downlink information element), or may be configured for each cell (for example, included in a Serving-CellConfig information element). The higher layer signaling regarding the plurality of channels/signals may be independently configured in a UL channel/signal and a DL channel/signal, or may be configured to be common.

Note that the DCI (or a field of the DCI) in the present disclosure may be interpreted as implicit reporting using the DCI. The implicit reporting using the DCI may include at least one of a time resource, a frequency resource, a control channel element (CCE) index, a physical resource block (PRB) index, a resource element (RE) index, a search space index, a control resource set (CORESET) index, and an aggregation level of (detected) DCI (or corresponding to the DCI or used for reception thereof).

Note that each of the embodiments described above may be applied when (operations of) the multi-TRPs or the multi-panels are configured for the UE, or may be applied in other cases. Each of the embodiments described above may be applied when the UE performs operation based on URLLC (or has capability for URLLC), or may be applied in other cases.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 20:
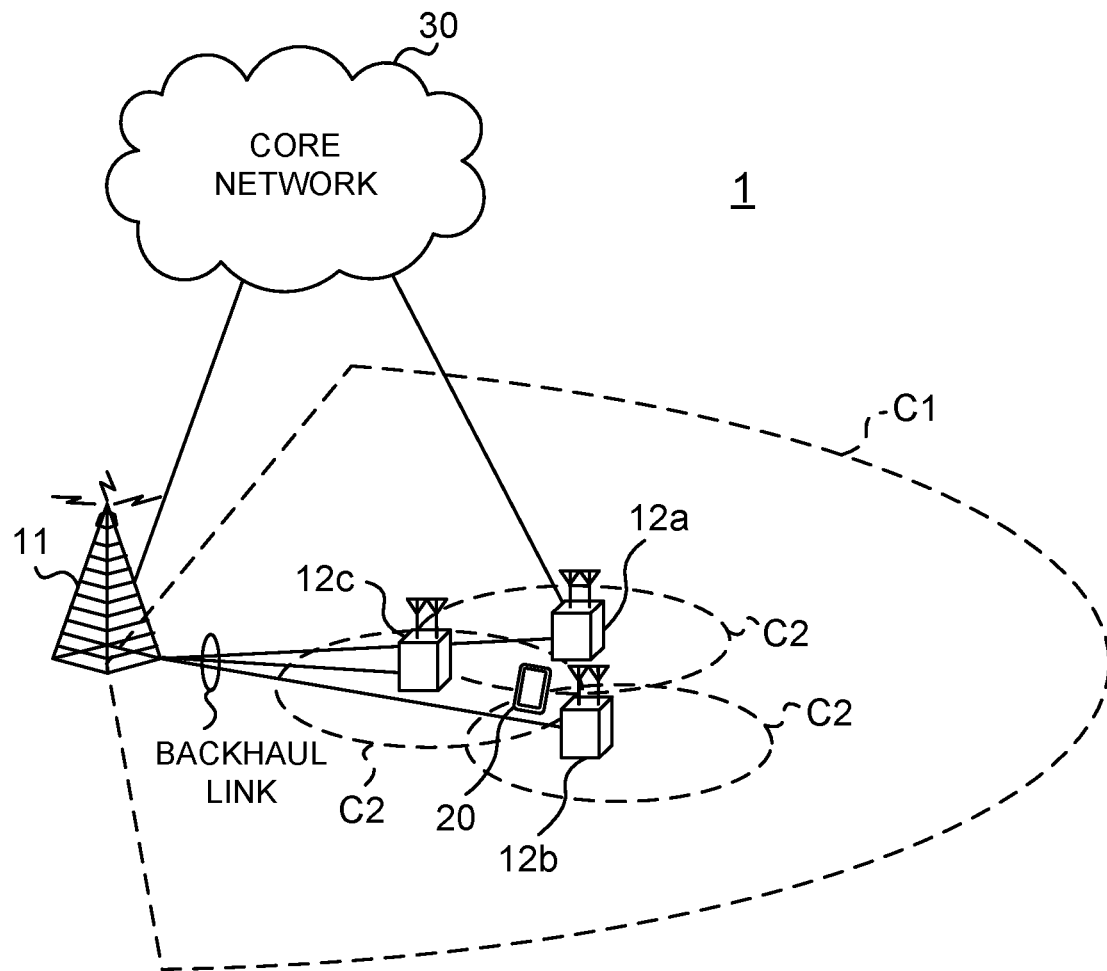
FIG. 20 is a diagram to show an example of a schematic structure of a radio communication system according to one embodiment.

FIG. 20 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 21:
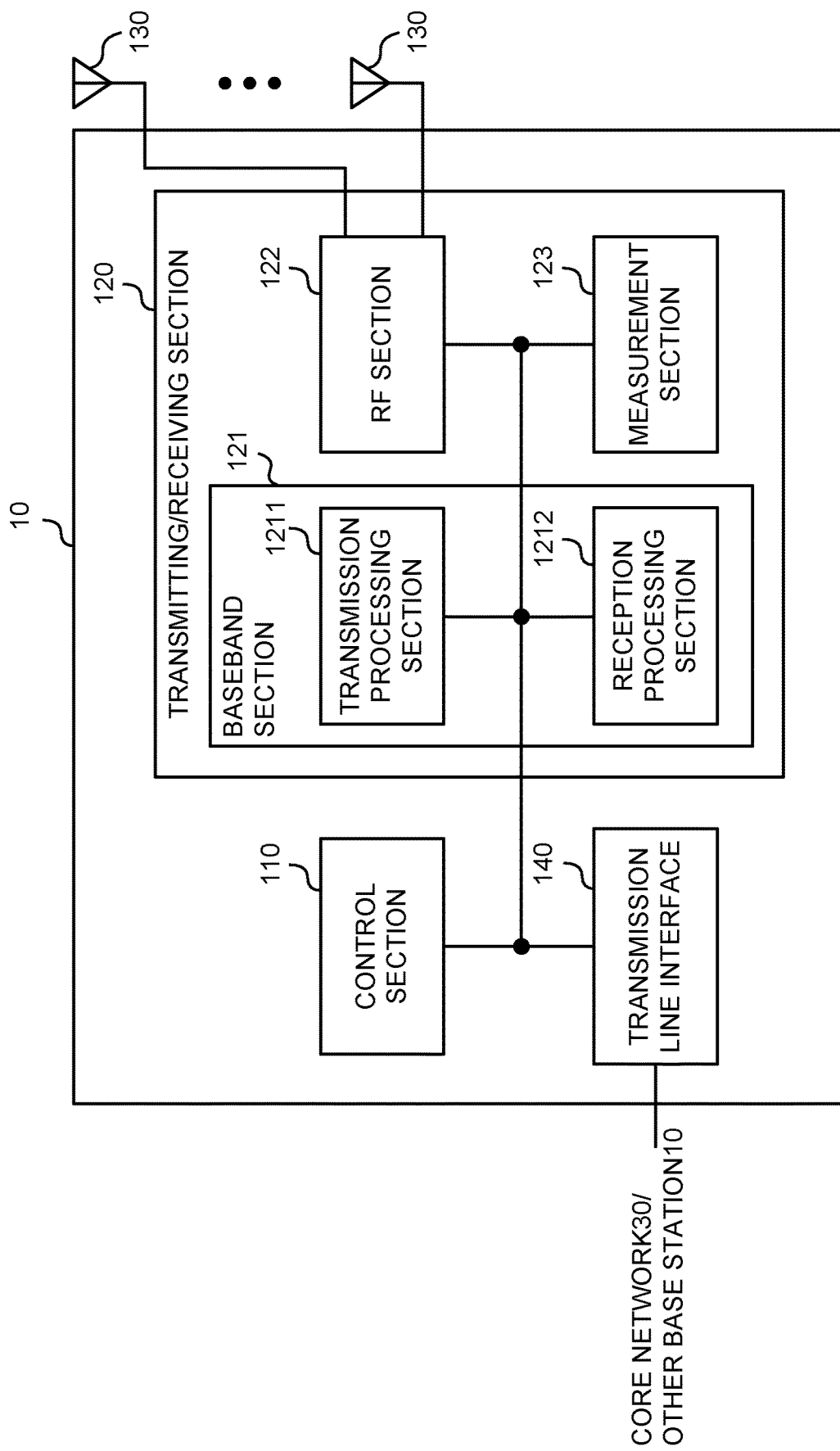
FIG. 21 is a diagram to show an example of a structure of a base station according to one embodiment.

FIG. 21 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate a bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit, to a terminal, information for determining one or more default TCI states to be applied to respective reception occasions of repeated reception of a downlink shared channel (Physical downlink Shared Channel (PDSCH)). The control section 110 may control the repeated reception using a spatial domain reception filter based on the one or more default TCI states.

(User Terminal)

Figure 22:
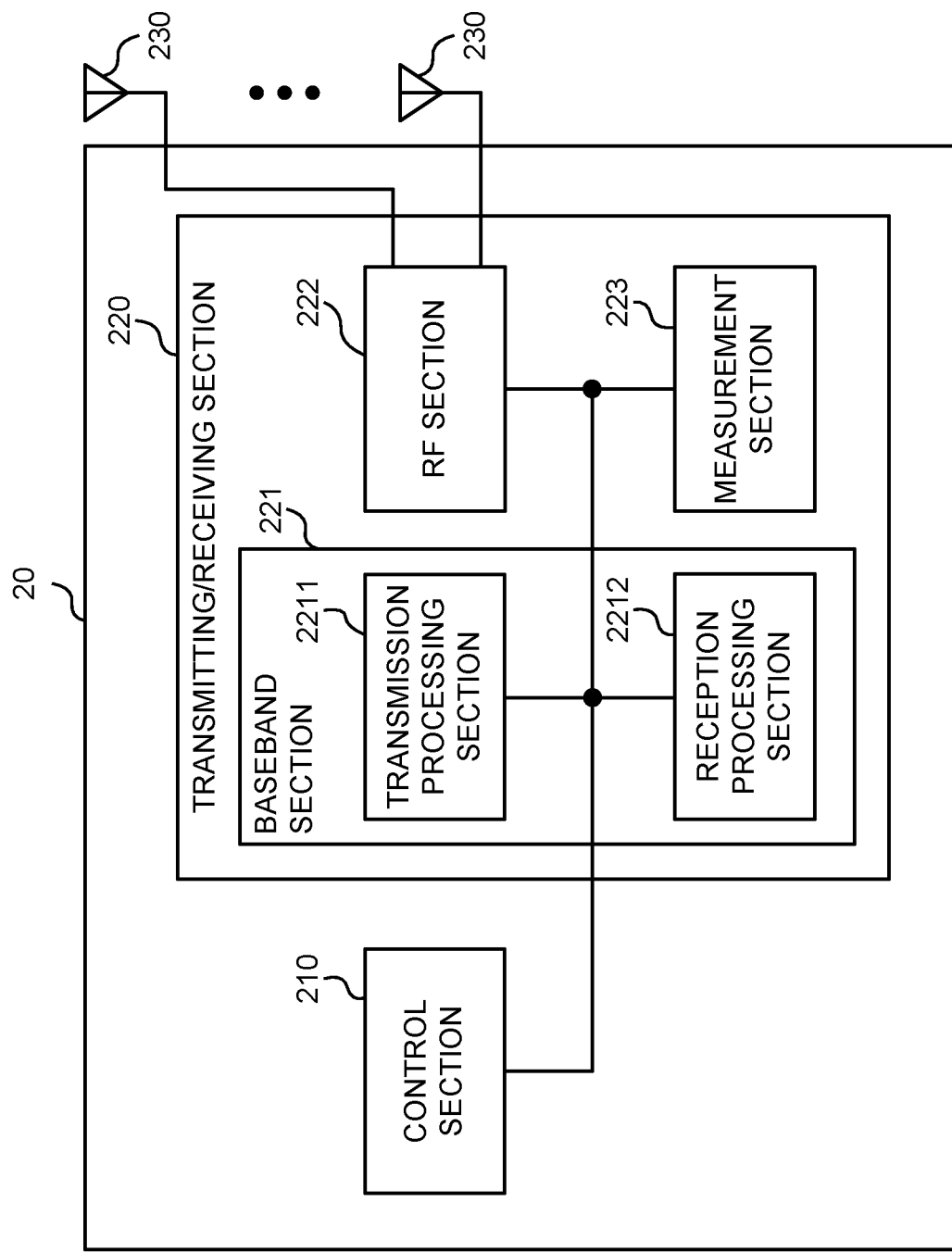
FIG. 22 is a diagram to show an example of a structure of a user terminal according to one embodiment.

FIG. 22 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The control section 210 may determine one or more default TCI states to be applied to each reception occasion of repeated reception of a downlink shared channel (Physical downlink Shared Channel (PDSCH)). The transmitting/receiving section 220 may carry out the repeated reception by using a spatial domain reception filter based on the one or more default TCI states.

The control section 210 may determine so that the one or more default TCI states include a Transmission Configuration Indication (TCI) state corresponding to all of configured control resource sets (CORESETs).

The control section 210 may determine so that the one or more default TCI states correspond to ordering of configured or activated TCI state IDs.

Three or more different TCI states may be allowed regarding default TCI states corresponding to at least one downlink control information code point.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 23:
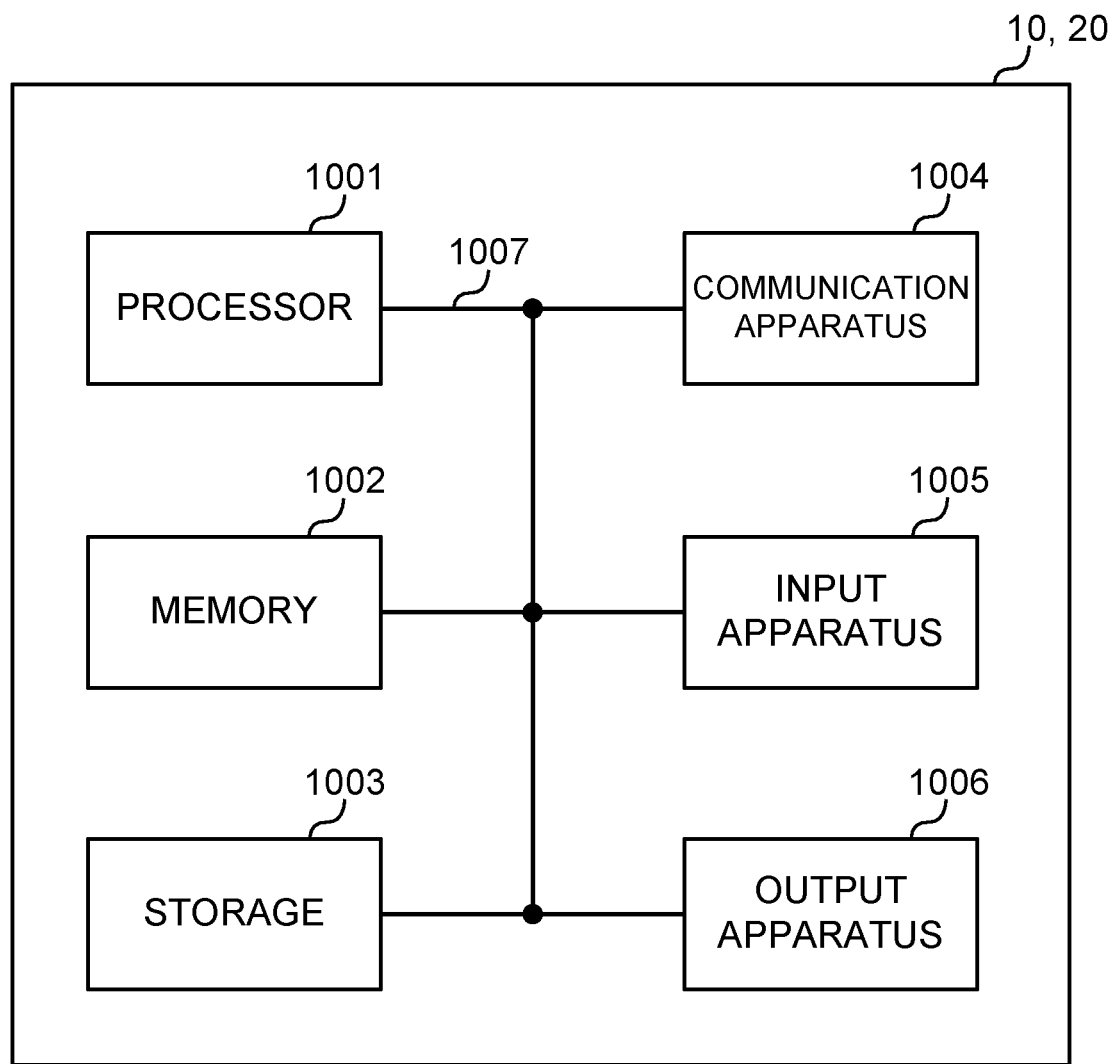
FIG. 23 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 23 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a transmitter that transmits terminal capability information;
a receiver that receives a downlink control information (DCI), the DCI scheduling a physical downlink shared channel (PDSCH) and indicating a transmission configuration indication (TCI) state; and
a processor that determines, based on the terminal capability information, a maximum number of TCI states applied in a reception of the PDSCH when a higher layer parameter including an information element of the TCI state indicated by the DCI is configured and an offset between the DCI and the PDSCH scheduled by the DCI is less than a threshold value,
wherein the higher layer parameter is commonly configured for a plurality of channels,
wherein the plurality of channels includes an uplink (UL) channel and a downlink (DL) channel,
wherein the information element of the TCI state comprises reference signal quasi-colocation relation information, and
wherein the processor determines a TCI state applied to a second PDSCH scheduled by a second DCI, based on an ordering of TCI states indicated by a medium access control control element (MAC CE) and a start position configured by a second higher layer parameter, when a number of TCI states indicated by a codepoint for the second PDSCH is greater than a number of TCI states applied to the second PDSCH.

2. A radio communication method performed by a terminal, the method comprising:
- transmitting terminal capability information;
- receiving a downlink control information (DCI), the DCI scheduling a physical downlink shared channel (PDSCH) and indicating a transmission configuration indication (TCI) state; and
- determining, based on the terminal capability information, a maximum number of TCI states applied in a reception of the PDSCH when a higher layer parameter including an information element of the TCI state indicated by the DCI is configured and an offset between the DCI and the PDSCH scheduled by the DCI is less than a threshold value,
- wherein the higher layer parameter is commonly configured for a plurality of channels,
- wherein the plurality of channels includes an uplink (UL) channel and a downlink (DL) channel,
- wherein the information element of the TCI state comprises reference signal quasi-colocation relation information, and
- wherein the terminal determines a TCI state applied to a second PDSCH scheduled by a second DCI, based on an ordering of TCI states indicated by a medium access control control element (MAC CE) and a start position configured by a second higher layer parameter, when a number of TCI states indicated by a codepoint for the second PDSCH is greater than a number of TCI states applied to the second PDSCH.

3. A system comprising the terminal according to claim 1, and a base station.

* * * * *